US009667036B2

(12) United States Patent
Ishikawa et al.

(10) Patent No.: US 9,667,036 B2
(45) Date of Patent: May 30, 2017

(54) ESD PROTECTION COMPONENT

(71) Applicant: TDK CORPORATION, Tokyo (JP)

(72) Inventors: Yuma Ishikawa, Tokyo (JP); Makoto Yoshino, Tokyo (JP)

(73) Assignee: TDK CORPORATION, Tokyo (JP)

( * ) Notice: Subject to any disclaimer, the term of this patent is extended or adjusted under 35 U.S.C. 154(b) by 405 days.

(21) Appl. No.: 14/572,100

(22) Filed: Dec. 16, 2014

(65) Prior Publication Data

US 2015/0189798 A1 Jul. 2, 2015

(30) Foreign Application Priority Data

Dec. 26, 2013 (JP) ................................ 2013-269786

(51) Int. Cl.
*H02H 9/00* (2006.01)
*H01T 4/12* (2006.01)

(52) U.S. Cl.
CPC ..................................... *H01T 4/12* (2013.01)

(58) Field of Classification Search
CPC ........................................................ H01T 4/12
USPC ........................................................... 361/56
See application file for complete search history.

(56) References Cited

U.S. PATENT DOCUMENTS 8,503,147 B2 * 8/2013 Tsukizawa ........... H05K 9/0067 361/112
9,293,913 B2 * 3/2016 Umeda .................. H02H 9/044
2011/0279945 A1 11/2011 Tsukizawa et al.

FOREIGN PATENT DOCUMENTS

JP A-2011-243380 12/2011
JP A-2013-114788 6/2013

* cited by examiner

*Primary Examiner* — Stephen W Jackson
(74) *Attorney, Agent, or Firm* — Oliff PLC

(57) ABSTRACT

An ESD protection component includes opposite electrodes and a ground electrode. The opposite electrodes and the ground electrode each have an extraction portion and an opposite portion. The respective opposite portions of the opposite electrodes and the ground electrode are placed on the same layer. At least one of the opposite electrodes and the ground electrode, the extraction portion and the opposite portion are placed on respective different layers and, also, are electrically connected to each other via a through hole conductor.

4 Claims, 18 Drawing Sheets

ESD PROTECTION COMPONENT

BACKGROUND OF THE INVENTION

Field of the Invention

The present invention relates to ESD protection component.

Related Background Art

There have been known ESD protection component including an element body constituted by a plurality of insulator layers are stacked, opposite electrodes and a ground electrode which are placed to be spaced apart from each other inside the element body, and a plurality of external electrodes which are each provided correspondingly to a respective one of the opposite electrodes and the ground electrode (eg., cf. Japanese Patent Application Laid-Open Publication No. 2013-114788 (which will be referred to hereinafter as Patent Literature 1)). In the ESD protection component described in Patent Literature 1, the opposite electrodes and the ground electrode are exposed in the exterior surface of the element body in the same layer and are connected to the respective external electrodes placed on the exterior surface of the element body.

SUMMARY OF THE INVENTION

In the ESD protection component described in the aforementioned Patent Literature 1, the plurality of the electrodes are placed on the same layer and, also, these plural electrodes are exposed in the exterior surface of the element body in the same layer, which makes the total area of the electrodes in the same layer larger. This degrades the adherence between the insulator layers, thereby increasing the possibility of occurrences of structural defects.

The external electrodes are formed by applying a conductive paste and performing heat treatment thereon and, thereafter, performing electroplating thereon. Therefore, the ESD protection component is necessarily subjected to the plating solution during the manufacturing process. Accordingly, it is likely that structural defects are induced in the ESD protection component, which tends to induce infiltration of the plating solution into the element body, through the portions of the respective electrodes placed on the insulator layer which are exposed in the exterior surface of the element body. As a result thereof, the plating solution infiltrates therein up to the discharging portions for inducing discharge within the element body, and the gap portions may be filled with this plating solution, thereby inducing short-circuits.

It is an object of the present invention to provide a ESD protection component which can inhibit infiltration of a plating solution into discharging portions therein.

A ESD protection component in one aspect of the present invention includes: an element body constituted by a plurality of insulator layers are stacked; a ground electrode placed inside the element body; a first opposite electrode which is placed to be spaced apart from the ground electrode and forms a discharging portion in cooperation with the ground electrode; a second opposite electrode which is placed to be spaced apart from the ground electrode and forms a discharging portion in cooperation with the ground electrode; and a plurality of external electrodes each being provided correspondingly to a respective one of the ground electrode, the first opposite electrode and the second opposite electrode; wherein the ground electrode, the first opposite electrode and the second opposite electrode are each adapted to have an extraction portion connected to the corresponding external electrode out of the plurality of the external electrodes, and an opposite portion which is electrically connected to the extraction portion and forms the discharging portion, the opposite portion of the ground electrode, the opposite portion of the first opposite electrode, and the opposite portion of the second opposite electrode are placed on the same layer, and, in at least one of the ground electrode, the first opposite electrode and the second opposite electrode, the extraction portion and the opposite portion are placed on respective different layers and also are electrically connected to each other via a through hole conductor.

With the ESD protection component in the one aspect of the present invention, in at least one of the ground electrode, the first opposite electrode and the second opposite electrode, the extraction portion and the opposite portion are placed on the respective different layers and also are electrically connected to each other through the through hole conductor. This makes the total area of the electrodes existing in the same layer smaller. This can enhance the adherence between the insulator layers, which can reduce the possibility of occurrences of structural defects, thereby suppressing infiltration of the plating solution through such defects. This can suppress the infiltration of the plating solution into the discharging portion formed by the ground electrode and the first opposite electrode, and the discharging portion formed by the ground electrode and the second opposite electrode.

With the ESD protection component in one aspect of the present invention, the extraction portion of the ground electrode and the opposite portion of the ground electrode may be placed on respective different layers and also may be electrically connected to each other via a through hole conductor. In this case, the extraction portion of the ground electrode is placed on a different layer from the layer on which the respective opposite portions of the ground electrode, the first opposite electrode and the second opposite electrode are placed. This enables freely determining the conductor patterns of the respective opposite portions, regardless of the pattern of the extraction portion of the ground electrode, in the layer on which the respective opposite portions are placed.

In the ESD protection component in one aspect of the present invention, the extraction portion of the first opposite electrode and the opposite portion of the first opposite electrode may be placed on respective different layers and also may be electrically connected to each other via a through hole conductor, and the extraction portion of the second opposite electrode and the opposite portion of the second opposite electrode may be placed on respective different layers and also may be electrically connected to each other via a through hole conductor. In this case, the total area of the electrodes existing in the same layer is further reduced. This can further enhance the adherence between the insulator layers, which can further reduce the possibility of occurrences of structural defects, thereby further suppressing infiltration of the plating solution through such defects. This can suppress the infiltration of the plating solution into the discharging portions, more certainly.

In a ESD protection component in one aspect of the present invention, each of the extraction portions may have an end connected to the corresponding external electrode out of the plurality of the external electrodes, the end being exposed from the element body, the exterior surface has a first region in which the end of the extraction portion of the first opposite electrode is exposed and a second region in which the end of the extraction portion of the second opposite electrode is exposed, and the opposite portion of the ground electrode may be placed at a position closer to the first region than the opposite portion of the first opposite electrode and, also, the opposite portion of the ground electrode may be placed at a position closer to the second region than the opposite portion of the second opposite electrode. In this case, the opposite portion of the first opposite electrode and the opposite portion of the second opposite electrode are placed to be spaced apart from the exterior surfaces of the element body more largely than the opposite portion of the ground electrode, which can increase both the length of the extension of the extraction portion of the first opposite electrode from the exterior surface of the element body to the opposite portion, and the length of the extension of the extraction portion of the second opposite electrode from the exterior surface of the element body to the opposite portion. This increases the distances from the portions of the first opposite electrode and the second opposite electrode which are exposed in the exterior surfaces of the element body to their opposite portions, which inhibits the plating solution having entered through these exposed portions from infiltrating into the opposite portions. This can suppress the infiltration of the plating solution into the discharging portions formed by the opposite portions.

DESCRIPTION OF THE PREFERRED EMBODIMENTS

Figure 1:
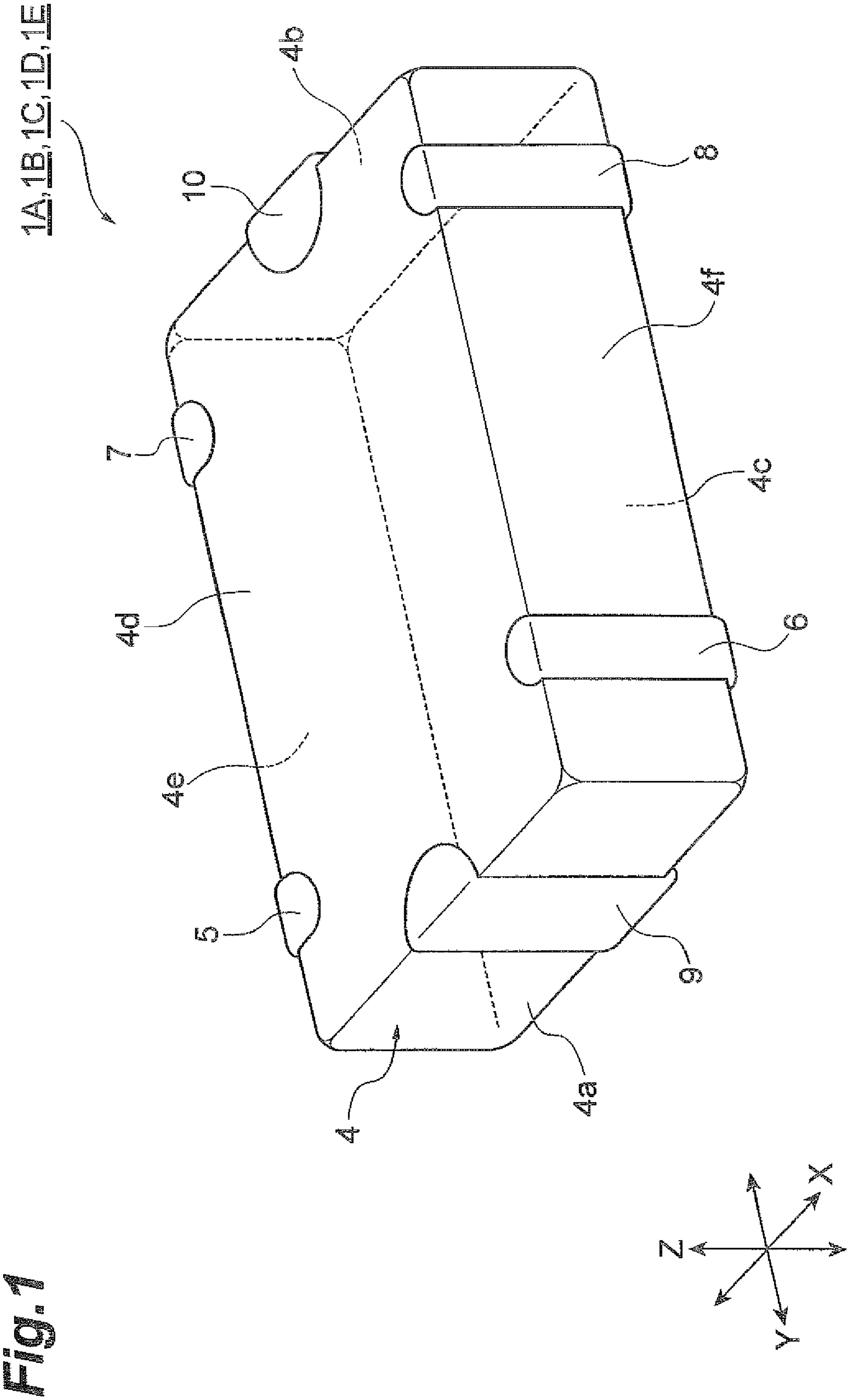
FIG. 1 is a perspective view illustrating ESD protection component according to first to fifth embodiments.

Hereinafter, an embodiment of the present invention will be described in detail, with reference to the accompanying drawings. Further, in the description, the same components or components having the same functions will be designated by the same reference characters and will not be described redundantly.

First Embodiment

Figure 2:
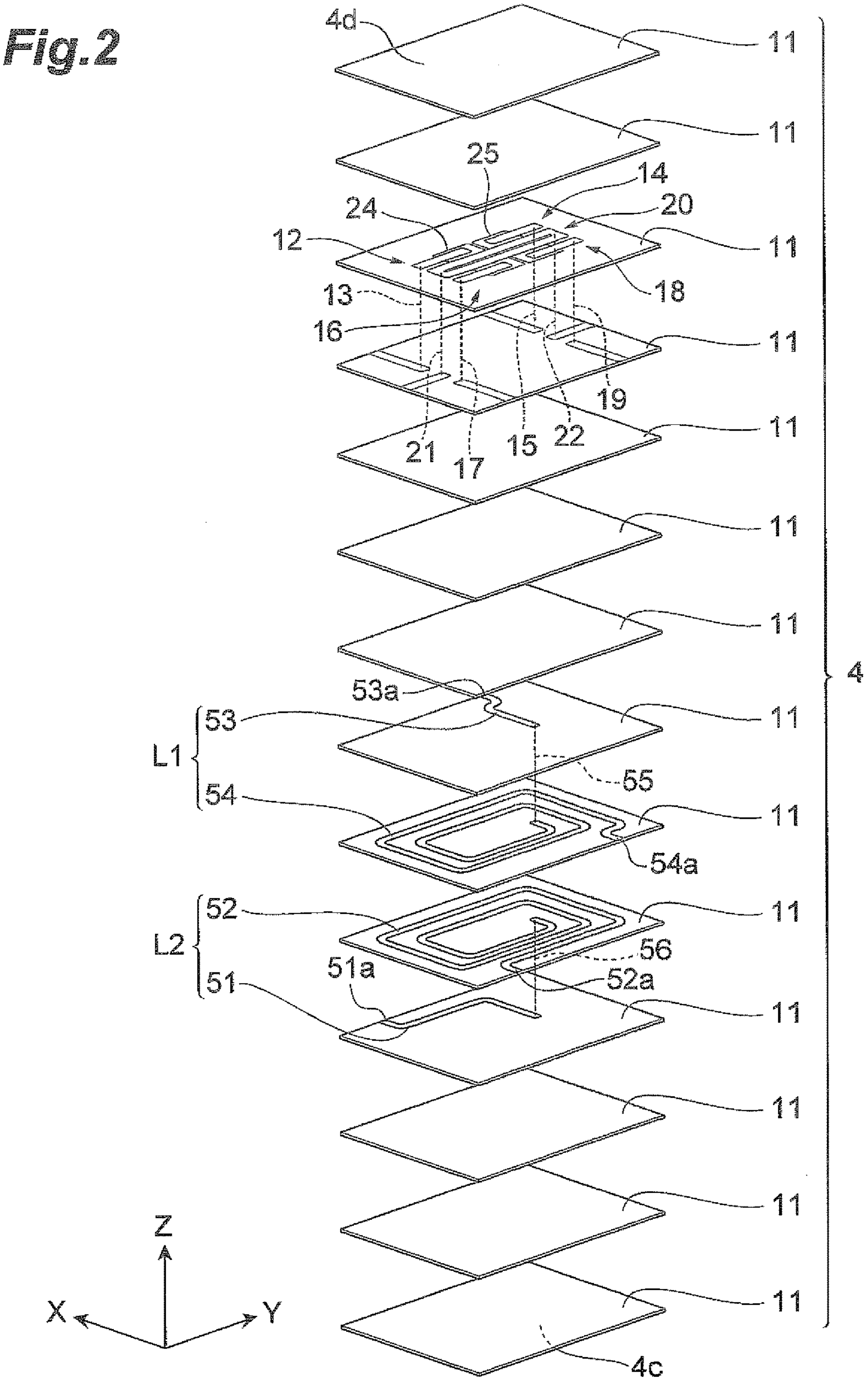
FIG. 2 is an exploded perspective view illustrating the structure of an element body according to the first embodiment.
Figure 3:
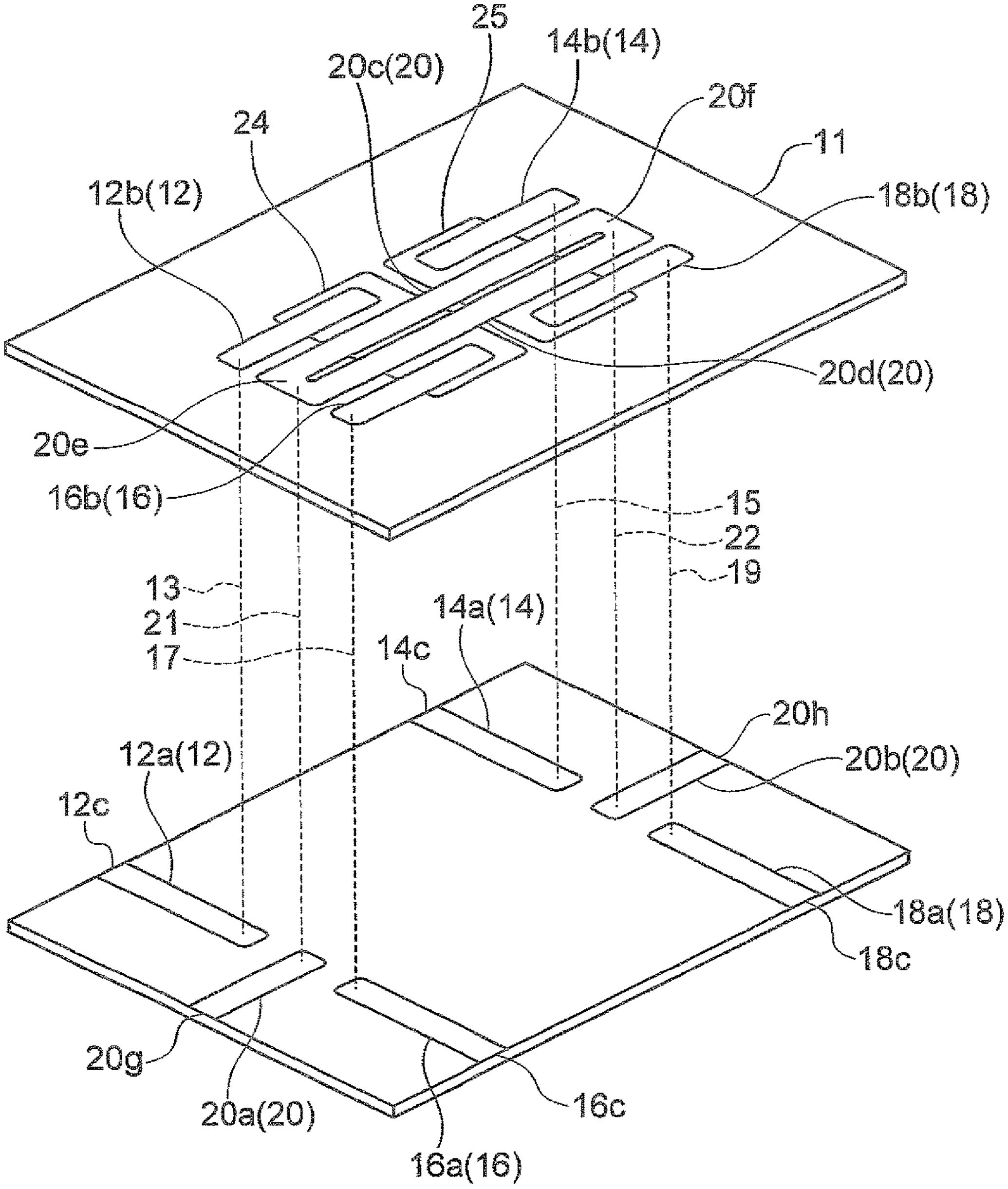
FIG. 3 is an exploded perspective view illustrating the structure of a portion including first to fourth discharging portions in FIG. 2.
Figure 4:
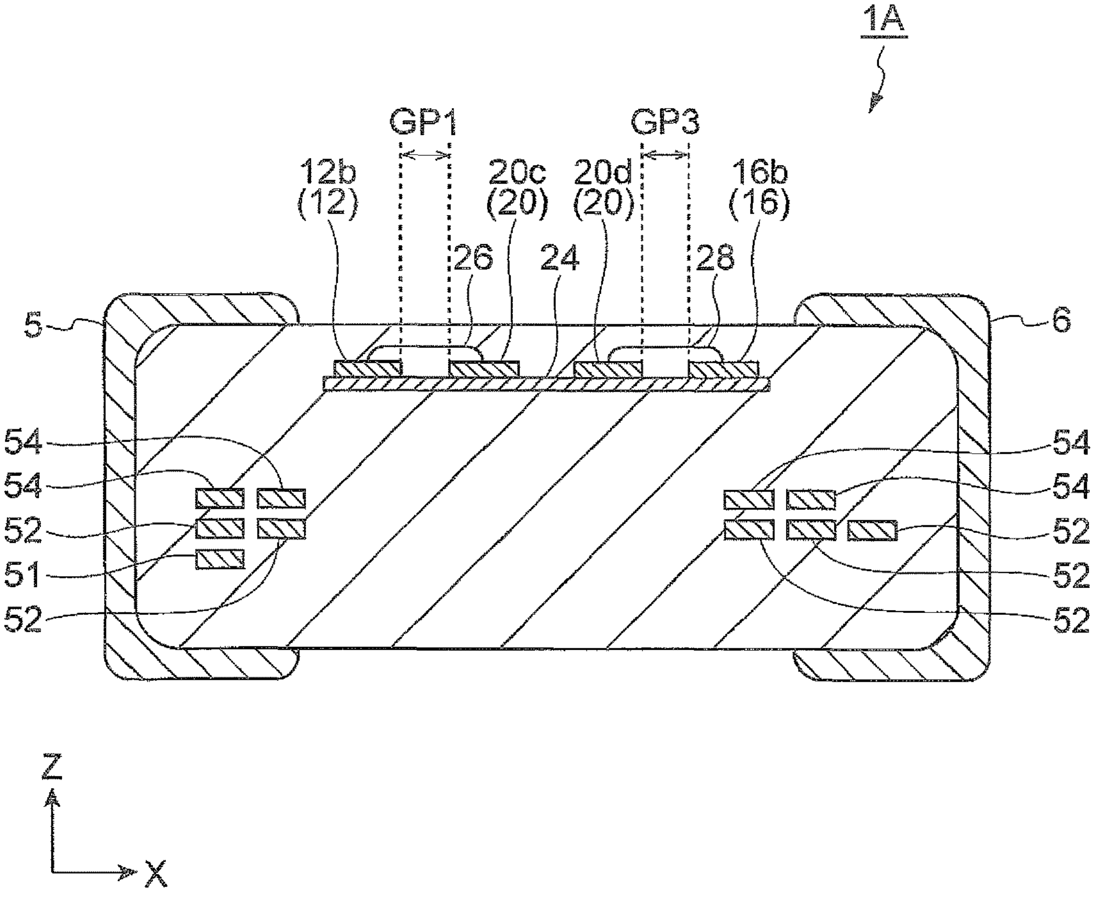
FIG. 4 is a view illustrating the structure of a cross section including the first discharging portion and the third discharging portion in the ESD protection component according to the first embodiment.
Figure 5:
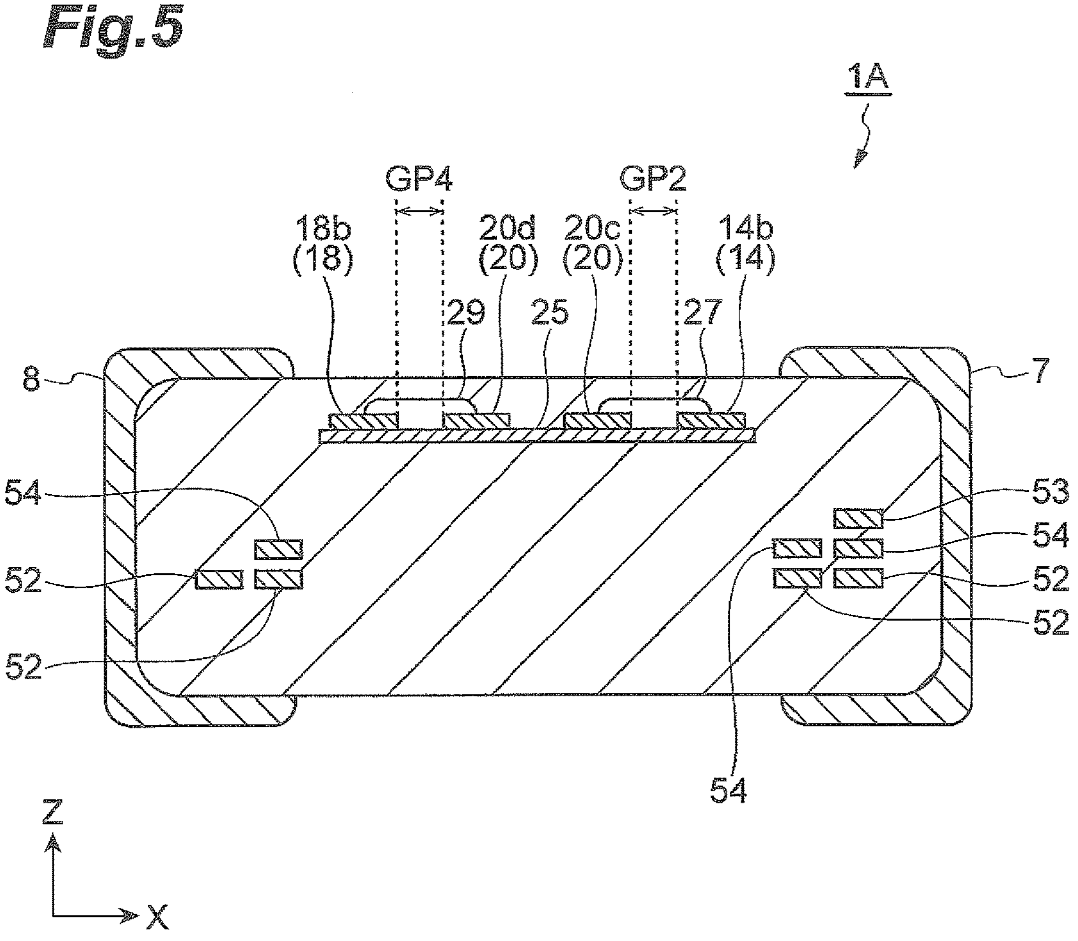
FIG. 5 is a view illustrating the structure of a cross section including the second discharging portion and the fourth discharging portion in the ESD protection component according to the first embodiment.

At first, with reference to FIGS. 1 to 5, the structure of a ESD protection component according to a first embodiment will be described. FIG. 1 is a perspective view illustrating the ESD protection component according to first to fifth embodiments. FIG. 2 is an exploded perspective view illustrating the structure of an element body according to the first embodiment. FIG. 3 is an exploded perspective view illustrating the structure of a portion including first to fourth discharging portions in FIG. 2. FIG. 4 is a view illustrating the structure of a cross section including the first discharging portion and the third discharging portion in the ESD protection component according to the first embodiment. FIG. 5 is a view illustrating the structure of a cross section including the second discharging portion and the fourth discharging portion in the ESD protection component according to the first embodiment.

An ESD protection component 1A according to the present embodiment is an electronic member which is mounted on a circuit board in an electronic apparatus and is adapted to protect the electronic apparatus from ESD (Electro-Static Discharge). As illustrated in FIGS. 1 to 5, the ESD protection component 1A includes an element body 4, external electrodes 5 to 10, opposite electrodes 12, 14, 16 and 18, two or more discharging portions (a first discharging portion GP1, a second discharging portion GP2, a third discharging portion GP3 and a fourth discharging portion GP4), discharge inducing portions 24 and 25, cavity portions 26 to 29, and coils L1 and L2. The element body 4 has a substantially-rectangular parallelepiped shape. The external electrodes 5 to 10 are placed on the exterior surface of the element body 4. The opposite electrodes 12, 14, 16 and 18 are placed inside the element body 4. A ground electrode 20 is placed inside the element body 4. The first discharging portion GP1, the second discharging portion GP2, the third discharging portion GP3 and the fourth discharging portion GP4 are placed inside the element body 4. The discharge inducing portions 24 and 25 are placed inside the element body 4. The cavity portions 26 to 29 are placed inside the element body 4. The coils L1 and L2 are placed inside the element body 4. Hereinafter, a stack direction of the plurality of insulator layers in the element body 4 will be defined as a Z direction (an upward/downward direction), the widthwise direction in the end surfaces and cross sections in the stack direction (hereinafter, simply referred to as "the widthwise direction of the element body 4") will be defined as an X direction, and the longitudinal direction thereof (hereinafter, simply referred to as "the longitudinal direction of the element body 4") will be defined as a Y direction.

The element body 4 is constituted by a plurality of insulator layers 11 which are stacked. Each insulator layer 11 has a substantially-rectangular shape. Each insulator layer 11 is an insulator having an electrically-insulating property and is formed from a sintered insulator green sheet. In the actual element body 4, the respective insulator layers 11 are integrated with each other so that no boundary can be visually recognized between them. The element body 4 has a pair of end surfaces 4*a* and 4*b* opposed to each other, and four side surfaces adjacent to the end surfaces 4*a* and 4*b*, as exterior surfaces. A side surface 4*c*, out of the four side surfaces, is defined as a surface (a mounting surface) which is faced to another electronic apparatuses (for example, a circuit board or an electronic member) which is not illustrated.

The external electrode 5 is placed on the side surface 4*e* of the element body 4. The external electrode 5 is placed at a position closer to the end surface 4*a* than to the end surface 4*b*, in the longitudinal direction (the Y direction in the figure) of the element body 4. The external electrode 5 is formed such that it partially covers a portion of the side surface 4*c* of the element body 4 and a portion of the side surface 4*d* of the element body 4.

The external electrode 6 is placed on the side surface 4*f* of the element body 4. The external electrode 6 is placed at a position closer to the end surface 4*a* than to the end surface 4*b*, in the longitudinal direction of the element body 4. The external electrode 6 is formed such that it partially covers a portion of the side surface 4*c* of the element body 4 and a portion of the side surface 4*d* of the element body 4.

The external electrode 7 is placed on the side surface 4*e* of the element body 4. The external electrode 7 is placed at a position closer to the end surface 4*b* than to the end surface 4*a*, in the longitudinal direction of the element body 4. The external electrode 7 is formed such that it partially covers a portion of the side surface 4*c* of the element body 4 and a portion of the side surface 4*d* of the element body 4.

The external electrode 8 is placed on the side surface 4*f* of the element body 4. The external electrode 8 is placed at a position closer to the end surface 4*b* than to the end surface 4*a*, in the longitudinal direction of the element body 4. The external electrode 8 is formed such that it partially covers a portion of the side surface 4*c* of the element body 4 and a portion of the side surface 4*d* of the element body 4.

The external electrode 9 is placed on the end surface 4*a* of the element body 4. The external electrode 9 is placed at a substantially-center position, in the widthwise direction (the X direction in the figure) of the element body 4. The external electrode 9 is formed such that it partially covers a portion of the side surface 4*c* of the element body 4 and a portion of the side surface 4*d* of the element body 4.

The external electrode 10 is placed on the end surface 4*b* of the element body 4. The external electrode 10 is placed at a substantially-center position, in the widthwise direction of the element body 4. The external electrode 10 is formed such that it partially covers a portion of the side surface 4*c* of the element body 4 and a portion of the side surface 4*d* of the element body 4.

The opposite electrode 12 is placed at a position closer to the end surface 4*a* than to the end surface 4*b* in the longitudinal direction of the element body 4 and, also, at a position closer to the side surface 4*e* than to the side surface 4*f* in the widthwise direction of the element body 4. The opposite electrode 12 has a first extraction portion 12*a* and a first opposite portion 12*b* (see FIG. 3). The first extraction portion 12*a* and the first opposite portion 12*b* are placed on respective different insulator layers 11. The first extraction portion 12*a* has an I shape extending in the widthwise direction of the element body 4. The first extraction portion 12*a* has an end portion 12*c* which is exposed in the side surface 4*e* of the element body 4 and is connected to the external electrode 5. The first opposite portion 12*b* has an I shape extending in the longitudinal direction of the element body 4. The first opposite portion 12*b* is electrically connected to the first extraction portion 12*a*, via a through hole conductor 13 positioned between the first opposite portion 12*b* and the first extraction portion 12*a*.

The opposite electrode 14 is placed at a position closer to the end surface 4*b* than to the end surface 4*a* in the longitudinal direction of the element body 4 and, also, at a position closer to the side surface 4*e* than to the side surface 4*f* in the widthwise direction of the element body 4. The opposite electrode 14 has a first extraction portion 14*a* and a first opposite portion 14*b*. The first extraction portion 14*a* is placed on a different insulator layer 11 from the layer on which the first opposite portion 12*b* of the opposite electrode 12 is placed, and the first opposite portion 14*b* is placed on the same insulator layer 11 as the layer on which the first opposite portion 12*b* of the opposite electrode 12 is placed. Namely, the first extraction portion 14*a* and the first opposite portion 14*b* are placed on the respective different insulator layers 11. The first extraction portion 14*a* has an I shape extending in the width direction of the element body 4. The first extraction portion 14*a* has an end portion 14*c* which is exposed in the side surface 4*e* of the element body 4 and is connected to the external electrode 7. The first opposite portion 14*b* has an I shape extending in the longitudinal direction of the element body 4. The first opposite portion 14*b* is electrically connected to the first extraction portion 14*a*, via a through hole conductor 15 positioned between the first opposite portion 14*b* and the first extraction portion 14*a*.

The opposite electrode 16 is placed at a position closer to the end surface 4*a* than to the end surface 4*b* in the longitudinal direction of the element body 4 and, also, at a position closer to the side surface 4*f* than to the side surface 4*e* in the widthwise direction of the element body 4. The opposite electrode 16 has a first extraction portion 16*a* and a first opposite portion 16*b*. The first extraction portion 16*a* is placed on a different insulator layer 11 from the layer on which the first opposite portion 12*b* of the opposite electrode 12 is placed, and the first opposite portion 16*b* is placed on the same insulator layer 11 as the layer on which the first opposite portion 12*b* of the opposite electrode 12 is placed.

Namely, the first extraction portion 16*a* and the first opposite portion 16*b* are placed on the respective different insulator layers 11. The first extraction portion 16*a* has an I shape extending in the width direction of the element body 4. The first extraction portion 16*a* has an end portion 16*c* which is exposed in the side surface 4*f* of the element body 4 and is connected to the external electrode 6. The first opposite portion 16*b* has an I shape extending in the longitudinal direction of the element body 4. The first opposite portion 16*b* is electrically connected to the first extraction portion 16*a*, via a through hole conductor 17 positioned between the first opposite portion 16*b* and the first extraction portion 16*a*.

The opposite electrode 18 is placed at a position closer to the end surface 4*b* than to the end surface 4*a* in the longitudinal direction of the element body 4 and, also, at a position closer to the side surface 4*f* than to the side surface 4*e* in the widthwise direction of the element body 4. The opposite electrode 18 has a first extraction portion 18*a* and a first opposite portion 18*b*. The first extraction portion 18*a* is placed on a different insulator layer 11 from the layer on which the first opposite portion 12*b* of the opposite electrode 12 is placed, and the first opposite portion 18*b* is placed on the same insulator layer 11 as the layer on which the first opposite portion 12*b* of the opposite electrode 12 is placed. Namely, the first extraction portion 18*a* and the first opposite portion 18*b* are placed on the respective different insulator layers 11. The first extraction portion 18*a* has an I shape extending in the width direction of the element body 4. The first extraction portion 18*a* has an end portion 18*c* which is exposed in the side surface 4*f* of the element body 4 and is connected to the external electrode 8. The first opposite portion 18*b* has an I shape extending in the longitudinal direction of the element body 4. The first opposite portion 18*b* is electrically connected to the first extraction portion 18*a*, via a through hole conductor 19 positioned between the first opposite portion 18*b* and the first extraction portion 18*a*.

The ground electrode 20 is placed at a substantially-center position in the widthwise direction of the element body 4. The ground electrode 20 includes a second extraction portion 20*a*, a second extraction portion 20*b*, a second opposite portion 20*c* and a second opposite portion 20*d*. The second extraction portion 20*a* and the second extraction portion 20*b* are placed on a different insulator layer 11 from the layer on which the first opposite portion 12*b* of the opposite electrode 12 is placed, and the second opposite portion 20*c* and the second opposite portion 20*d* are placed on the same insulator layer 11 as the layer on which the first opposite portion 12*b* of the opposite electrode 12 is placed. Namely, the second extraction portion 20*a* and the second extraction portion 20*b*, and the second opposite portion 20*c* and the second opposite portion 20*d* are placed on the respective different insulator layers 11.

The second extraction portion 20*a* is placed at a position closer to the end surface 4*a* than to the end surface 4*b* in the longitudinal direction of the element body 4 and, also, at a substantially-center position in the widthwise direction of the element body 4. The second extraction portion 20*a* has an I shape extending in the longitudinal direction of the element body 4. The second extraction portion 20*a* has an end portion 20*g* which is exposed in the end surface 4*a* of the element body 4 and is connected to the external electrode 9.

The second extraction portion 20*b* is placed at a position closer to the end surface 4*b* than to the end surface 4*a* in the longitudinal direction of the element body 4 and, also, at a substantially-center position in the widthwise direction of the element body 4. The second extraction portion 20*b* has an I shape extending in the longitudinal direction of the element body 4. The second extraction portion 20*b* has an end portion 20*h* which is exposed in the end surface 4*b* of the element body 4 and is connected to the external electrode 10.

The second opposite portion 20*c* and the second opposite portion 20*d* are extended in the longitudinal direction of the element body 4. An end of the second opposite portion 20*c* and an end of the second opposite portion 20*d* are connected to each other to form a connection portion 20*e*. The connection portion 20*e* is electrically connected to the second extraction portion 20*a* via a through hole conductor 21. Thus, the second opposite portion 20*c* and the second opposite portion 20*d* are electrically connected to the second extraction portion 20*a* via the through hole conductor 21. The other end of the second opposite portion 20*c* and the other end of the second opposite portion 20*d* are connected to each other to form a connection portion 20*f*. The connection portion 20*f* is electrically connected to the second extraction portion 20*b* via a through hole conductor 22. Thus, the second opposite portion 20*c* and the second opposite portion 20*d* are electrically connected to the second extraction portion 20*b* via the through hole conductor 22. The second opposite portion 20*c*, the second opposite portion 20*d*, the connection portion 20*e*, and the connection portion 20*f* form a loop-shaped conductor pattern on the same insulator layer 11. The second opposite portion 20*c* and the second opposite portion 20*d* are extended in the longitudinal direction of the element body 4, in such a way as to be separated from each other with the connection portion 20*e* and the connection portion 20*f* serving as branch points.

The second opposite portion 20*c* is placed to face the first opposite portion 12*b* of the opposite electrode 12 and the first opposite portion 14*b* of the opposite electrode 14, in such a way as to be spaced apart therefrom. Thus, the first discharging portion GP1 is formed between the first opposite portion 12*b* of the opposite electrode 12 and the second opposite portion 20*c* of the ground electrode 20 (see FIG. 4), and the second discharging portion GP2 is formed between the first opposite portion 14*b* of the opposite electrode 14 and the second opposite portion 20*c* of the ground electrode 20 (see FIG. 5). With this structure, if a voltage with a magnitude which is equal to or more than a predetermined value is applied between the external electrode 5 and the external electrode 9, discharging is induced in the first discharging portion GP1. Similarly, if a voltage with a magnitude which is equal to or more than a predetermined value is applied between the external electrode 7 and the external electrode 10, discharging is induced in the second discharging portion GP2.

The second opposite portion 20*d* is placed to face the first opposite portion 16*b* of the opposite electrode 16 and the first opposite portion 18*b* of the opposite electrode 18, in such a way as to be spaced apart therefrom. Thus, the third discharging portion GP3 is formed between the first opposite portion 16*b* of the opposite electrode 16 and the second opposite portion 20*d* of the ground electrode 20 (see FIG. 4), and the fourth discharging portion GP4 is formed between the first opposite portion 18*b* of the opposite electrode 18 and the second opposite portion 20*d* of the ground electrode 20 (see FIG. 5). With this structure, if a voltage with a magnitude which is equal to or more than a predetermined value is applied between the external electrode 6 and the external electrode 9, discharging is induced in the third discharging portion GP3. Similarly, if a voltage with a magnitude which is equal to or more than a predetermined value is applied between the external electrode 8 and the external electrode 10, discharging is induced in the fourth discharging portion GP4.

The discharge inducing portion 24 is positioned for the first discharging portion GP1 and the third discharging portion GP3 and has the function of facilitating the occurrence of discharge in the first discharging portion GP1 and the third discharging portion GP3. The discharge inducing portion 24 connects the first opposite portion 12*b* of the opposite electrode 12 to the second opposite portion 20*c* of the ground electrode 20 and, also, connects the first opposite portion 16*b* of the opposite electrode 16 to the second opposite portion 20*d* of the ground electrode 20.

The discharge inducing portion 25 is positioned for the second discharging portion GP2 and the fourth discharging portion GP4 and has the function of facilitating the occurrence of discharge in the second discharging portion GP2 and the fourth discharging portion GP4. The discharge inducing portion 25 connects the first opposite portion 14*b* of the opposite electrode 14 to the second opposite portion 20*c* of the ground electrode 20 and, also, connects the first opposite portion 18*b* of the opposite electrode 18 to the second opposite portion 20*d* of the ground electrode 20.

The cavity portion 26 is formed for the first discharging portion GP1. The cavity portion 26 has the function of absorbing thermal expansions of the first opposite portion 12*b*, the second opposite portion 20*c*, the insulator layer 11 and the discharge inducing portion 24 during discharging. The cavity portion 27 is formed for the second discharging portion GP2. The cavity portion 27 has the function of absorbing thermal expansions of the first opposite portion 14*b*, the second opposite portion 20*c*, the insulator layer 11 and the discharge inducing portion 25 during discharging. The cavity portion 28 is formed for the third discharging portion GP3. The cavity portion 28 has the function of absorbing thermal expansions of the first opposite portion 16*b*, the second opposite portion 20*d*, the insulator layer 11 and the discharge inducing portion 24, during discharging. The cavity portion 29 is formed for the fourth discharging portion GP4. The cavity portion 29 has the function of absorbing thermal expansions of the first opposite portion 18*b*, the second opposite portion 20*d*, the insulator layer 11 and the discharge inducing portion 25, during discharging.

The coil L1 and the coil L2 are placed closer to the side surface 4*c* of the element body 4, than the layers on which the opposite electrodes 12, 14, 16 and 18 and the ground electrode 20 are placed, in the stack direction of the plurality of insulator layers 11. The coil L1 and the coil L2 are placed, such that the coil L2 and the coil L1 are juxtaposed in the mentioned order from the side closer to the side surface 4*c* of the element body 4. The coil L2 is constituted by conductors 51 and 52 which are plural internal conductors juxtaposed in the stack direction of the plurality of insulator layers 11 inside the element body 4, and a through hole conductor 56 which is positioned between the conductors 51 and 52 and connects end portions of the conductors 51 and 52 to each other. The conductor 52 has a spiral shape. The conductors 51 and 52 are placed, such that the conductor 51 and the conductor 52 are juxtaposed in the mentioned order from the side closer to the side surface 4*c* of the element body 4, in the stack direction of the plurality of insulator layers 11.

The conductor 51 has an end portion 51*a* which is exposed in the side surface 4*e* of the element body 4 and is connected to the external electrode 5. The conductor 52 has an end portion 52*a* which is exposed in the side surface 4*f* of the element body 4 and is connected to the external electrode 6. Accordingly, the coil L2 is electrically connected to the external electrode 5 and the external electrode 6.

The coil L1 is constituted by conductors 53 and 54 which are plural internal conductors juxtaposed in the stack direction of the plurality of insulator layers 11 inside the element body 4, and a through hole conductor 55 which is positioned between the conductors 53 and 54 and connects end portions of the conductors 53 and 54 to each other. The conductor 54 has a spiral shape. The conductors 53 and 54 are placed, such that the conductor 53 and the conductor 54 are juxtaposed in the mentioned from the side closer to the side surface 4*d* of the element body 4, in the stack direction of the plurality of insulator layers 11.

The conductor 53 has an end portion 53*a* which is exposed in the side surface 4*e* of the element body 4 and is connected to the external electrode 7. The conductor 54 has an end portion 54*a* which is exposed in the side surface 4*f* of the element body 4 and is connected to the external electrode 8. Accordingly, the coil L1 is electrically connected to the external electrode 7 and the external electrode 8.

The coil L1 and the coil L2 form a so-called common-mode filter, since the conductors 52 and 54 which have the respective spiral shapes are magnetically coupled to each other.

Next, the materials of the respective constituents will be described in detail.

The external electrodes 5 to 10, the opposite electrodes 12, 14, 16 and 18, and the ground electrode 20 are formed from respective conductor materials containing Ag, Pd, Au, Pt, Cu, Ni, Al, Mo or W. The external electrodes 5 to 10 can be formed from an alloy such as an Ag/Pd alloy, an Ag/Cu alloy, an Ag/Au alloy or an Ag/Pt alloy.

The insulator layers 11 are formed from a material, out of $Fe_2O_3$, NiO, CuO, ZnO, MgO, $SiO_2$, $TiO_2$, $Mn_2O_3$, SrO, CaO, BaO, $SnO_2$, $K_2O$, $Al_2O_3$, $ZrO_2$, $B_2O_3$ and the like. The insulator layers 11 may be also formed from a ceramic material made of a mixture of two or more types of materials, out of them. The insulator layers 11 may contain a glass. The insulator layers 11 preferably contain copper oxide (CuO or $Cu_2O$), in order that they can be sintered at lower temperatures.

Each of the conductors 51 to 54 and each of the through hole conductors 13, 15, 17, 19, 21, 22, 55 and 56 contain a conductor material such as Ag or Pd, for example. The respective conductors 51 to 54 and the respective through hole conductors 13, 15, 17, 19, 21, 22, 55 and 56 are formed to be components formed by sintering a conductive paste containing the aforementioned conductor material.

The discharge inducing portions 24 and 25 are formed to contain a material, out of $Fe_2O_3$, NiO, CuO, ZnO, MgO, SiO, $TiO_2$, $Mn_2O_3$, SrO, CaO, BaO, $SnO_2$, $K_2O$, $Al_2O_3$, $ZrO_2$, $B_2O_3$ and the like. The discharge inducing portions 24 and 25 may be also formed to contain a material made of a mixture of two or more types of materials out of them. The discharge inducing portions 24 and 25 contain metal particles formed from Ag, Pd, Au, Pt, an Ag/Pd alloy, an Ag/Cu alloy, an Ag/Au alloy, an Ag/Pt alloy, or the like. The metal material contained as the metal particles in the discharge inducing portions 24 and 25 may have a higher melting point than that of the conductor material contained in the respective conductors 51 to 54 forming the coils L1 and L2. The discharge inducing portions 24 and 25 preferably contain semiconductor particles made of $RuO_2$ and the like. The discharge inducing portions 24 and 25 may also contain a glass or a lead oxide (SnO or $SnO_2$).

Figure 6:
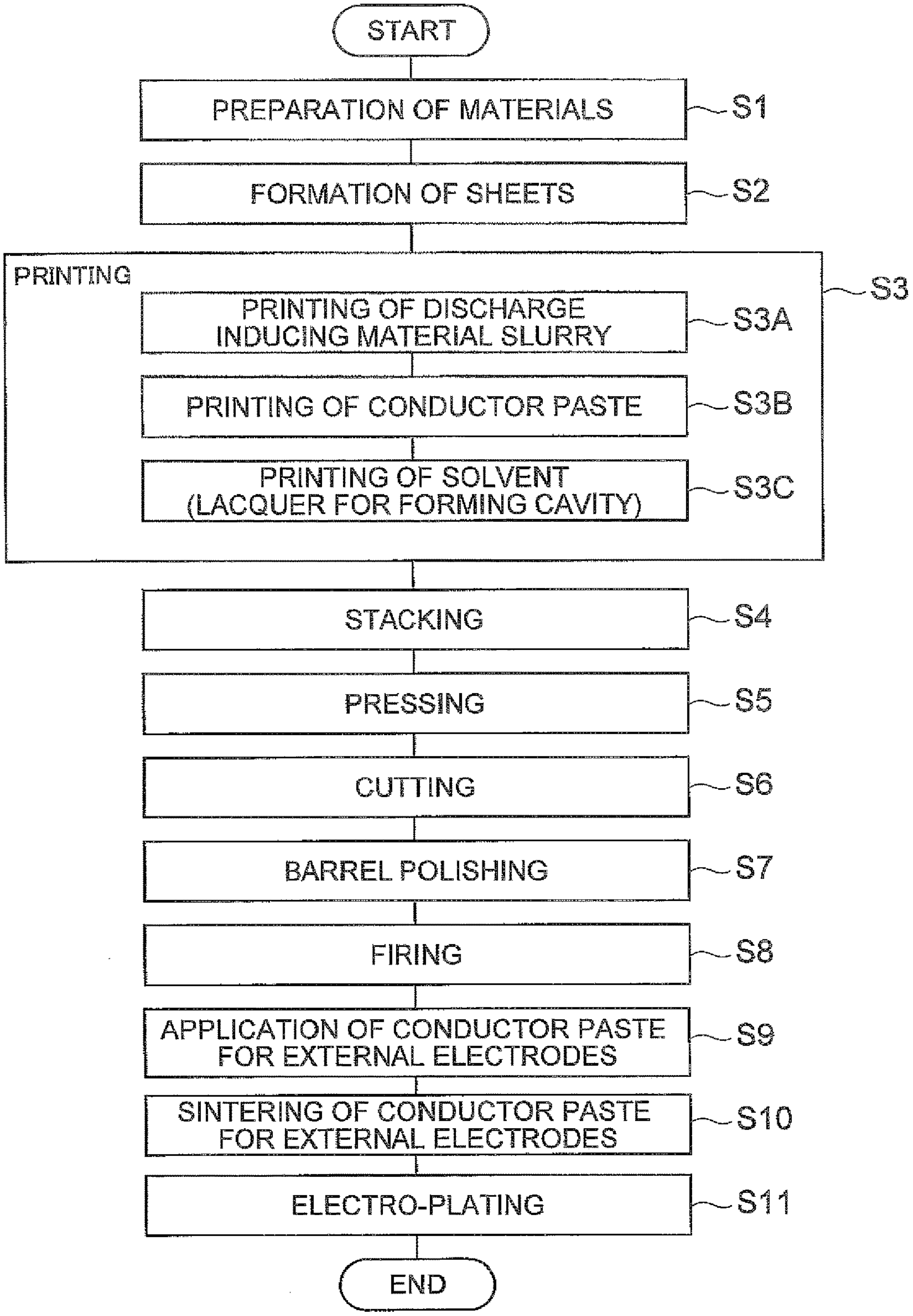
FIG. 6 is a flow chart illustrating a method for manufacturing the ESD protection component according to the first embodiment.

Next, with reference to FIG. 6, a method for manufacturing an ESD Protection component according to the present embodiment will be described. FIG. 6 is a flow chart illustrating the method for manufacturing the ESD Protection component according to the present embodiment.

At first, slurry of materials to form the insulator layers 11 is prepared (S1), and green sheets for the insulator layers 11 are formed (S2). More specifically, a predetermined amount of a dielectric powder containing a copper oxide (CuO), and an organic vehicle containing an organic solvent and an organic binder are mixed to prepare slurry for the insulator layers 11. As the dielectric powder, it is possible to employ a dielectric material containing an oxide of Mg, Cu, Zn, Si or Sr (or other dielectric materials), as a main ingredient. Thereafter, the slurry is adhered to PET films, through a doctor blade process and the like, to form green sheets with a thickness of about 20 micrometers. Further, through holes have been formed therein through laser processing, at positions where the respective through hole conductors 13, 15, 17, 19, 21, 22, 55 and 56 are to be formed in the respective insulator layers 11.

After the green sheets for the insulator layers 11 have been formed, discharge-inducing-material slurry, a conductor paste, and a solvent (lacquer for cavitys) are adhered, through printing, to these green sheets at predetermined positions (S3). The printing of the discharge-inducing-material slurry is performed by preparing the discharge-inducing-material slurry for forming the discharge inducing portions 24 and 25 after firing and, further, applying this discharge-inducing-material slurry to the sheets for the insulator layers 11 (S3A). More specifically, respective powders of a tin oxide, an insulator and a conductor in predetermined amounts which have been measured, and an organic vehicle containing an organic solvent and an organic binder are mixed to prepare the discharge-inducing-material slurry. For example, it is possible to employ $SnO_2$ for industrial purpose as the tin oxide, and it is possible to employ a dielectric powder as the insulator. As the dielectric powder, it is possible to employ a dielectric material containing an oxide of Mg, Cu, Zn, Si or Sr (or other dielectric materials), as a main ingredient. As the conductor powder, it is possible to employ an Ag/Pd powder (or Ag, Pd, Au, Pt or a mixture or a compound of them). The respective powders are sufficiently mixed into a state where the tin-oxide particles and the Ag/Pd-alloy metal particles are mingled with each other. The discharge-inducing-material slurry is to form the discharge inducing portions 24 and 25, through firing processing which will be described later.

The printing of the conductor paste is performed by applying the conductor paste for forming conductor patterns, to the green sheets for the insulator layers 11, through screen printing and the like (S3B). The conductor patterns are to form the respective conductors 51 to 54, the opposite electrodes 12, 14, 16 and 18 and the ground electrode 20, through the firing processing which will be described later. The respective conductor patterns are formed by drying the conductor paste after the screen printing. The conductor paste is filled into the through holes, during the formation of the respective conductor patterns. The conductor paste filled in the through holes is to form the respective through hole conductors 13, 15, 17, 19, 21, 22, 55 and 56, through the firing processing which will be described later.

The printing of the cavity lacquer is performed by applying the cavity lacquer to the green sheets for the insulator layers 11, such that it is overlaid on the conductor paste for forming the first opposite portion 12*b* of the opposite electrode 12 and the second opposite portion 20*c* of the ground electrode 20 which have been already printed, the conductor paste for forming the first opposite portion 14*b* of the opposite electrode 14 and the second opposite portion 20*c* of the ground electrode 20 which have been already printed, the conductor paste for forming the first opposite portion 16*b* of the opposite electrode 16 and the second opposite portion 20*d* of the ground electrode 20 which have been already printed, and the conductor paste for forming the first opposite portion 18*b* of the opposite electrode 18 and the second opposite portion 20*d* of the ground electrode 20 which have been already printed (S3C). The cavity lacquer is a coating material for forming the cavity portions 26, 27, 28 and 29.

The green sheets for the insulator layers 11, on which the discharge-inducing-material slurry, the conductor paste and the cavity lacquer have been adhered through printing, are stacked in order (S4), then pressing is applied thereto (S5), to obtain a multilayer body of the green sheet, and this multilayer body is cut into sizes corresponding to those of individual ESD protection component 1 (S6). The stacking of the green sheets for the insulator layers 11 is arranged, such that the respective structures to be formed after the firing are in the order of the respective conductors 51 to 54, the discharge inducing portions 24 and 25, the first extraction portions 12*a*, 14*a*, 16*a* and 18*a* and the second extraction portions 20*a* and 20*b*, the first opposite portions 12*b*, 14*b*, 16*b* and 18*b* and the second opposite portions 20*c* and 20*d*, and the cavity portions 26 to 29, in the stack direction, from the side closer to the side surface 4*c* of the element body 4, which is the surface to be mounted on the circuit board.

Subsequently, barrel polishing is performed on the respective green chips created by cutting the multilayer body of the green sheets for the insulator layers 11 (S7). This results in formation of green chips having rounded corner portions and rounded ridge lines.

Next, after the barrel polishing process, the green chips are fired in predetermined conditions (for example, for 2 hours at 850 to 950 degrees C in the atmosphere) (S8). Thus, the green chips are formed into the element bodies 4 through the firing. This results in formation of the first discharging portion GP1 between the first opposite portion 12*b* and the second opposite portion 20*c*, the second discharging portion GP2 between the first opposite portion 14*b* and the second opposite portion 20*c*, the third discharging portion GP3 between the first opposite portion 16*b* and the second opposite portion 20*d*, and the fourth discharging portion GP4 between the first opposite portion 18*b* and the second opposite portion 20*d*. Further, during the firing process, the cavity lacquer is vanished, thereby forming the cavity portion 26 covering the first discharging portion GP1, the cavity portion 27 covering the second discharging portion GP2, the cavity portion 28 covering the third discharging portion GP3, and the cavity portion 29 covering the fourth discharging portion GP4. Namely, through the firing process, it is possible to provide an intermediate member including the first discharging portion GP1, the second discharging portion GP2, the third discharging portion GP3, and the fourth discharging portion GP4.

Subsequently, a conductor paste for the external electrodes 5 to 10 is applied to the element bodies 4 (S9), and thermal treatment is performed thereon under predetermined conditions (for example, for 2 hours at 600 to 800 degrees C in the atmosphere) to sinter the conductor paste for forming the external electrodes 5 to 10 (S10). Thereafter, plating is applied to the surfaces of the external electrodes 5 to 10 (S11). The plating is preferably electrolytic plating and, for example, it is possible to employ Ni/Sn, Cu/Ni/Sn, Ni/Pd/Au, Ni/Pd/Ag, Ni/Ag and the like.

Through the aforementioned processes, it is possible to provide an ESD protection component 1A.

As described above, in the ESD protection component 1A according to the present embodiment, the first extraction portions 12*a*, 14*a*, 16*a* and 18*a* of the opposite electrodes 12, 14, 16 and 18, and the first opposite portions 12*b*, 14*b*, 16*b* and 18*b* of the opposite electrodes 12, 14, 16 and 18 are placed on the respective different layers and, further, are electrically connected to each other via the through hole conductors 13, 15, 17 and 19. The second extraction portions 20*a* and 20*b* of the ground electrode 20 and the second opposite portions 20*c* and 20*d* of the ground electrode 20 are placed on the respective different layers and, further, are electrically connected to each other via the through hole conductors 21 and 22. This makes the total area of the electrodes existing on the same layer smaller. This can enhance the adherence between the insulator layers 11, which can reduce the possibility of occurrences of structural defects, thereby suppressing the infiltration of the plating solution through such defects. This can suppress the infiltration of the plating solution into the first discharging portion GP1 formed between the first opposite portion 12*b* of the opposite electrode 12 and the second opposite portion 20*c* of the ground electrode 20, the second discharging portion GP2 formed between the first opposite portion 14*b* of the opposite electrode 14 and the second opposite portion 20*d* of the ground electrode 20, the third discharging portion GP3 formed between the first opposite portion 16*b* of the opposite electrode 16 and the second opposite portion 20*d* of the ground electrode 20, and the fourth discharging portion GP4 formed between the first opposite portion 18*b* of the opposite electrode 18 and the second opposite portion 20*d* of the ground electrode 20. Particularly, in the present embodiment, the first extraction portions 12*a*, 14*a*, 16*a* and 18*a* of the opposite electrodes 12, 14, 16 and 18 and the second extraction portions 20*a* and 20*b* of the ground electrode 20 are all placed on a different layer from the layer on which the first opposite portions 12*b*, 14*b*, 16*b* and 18*b* and the second opposite portions 20*c* and 20*d* are placed, which can reduce the total area of the electrodes existing on the same layer as much as possible, thereby certainly suppressing the infiltration of the plating solution into the discharging portions for inducing discharge.

Second Embodiment

Figure 7:
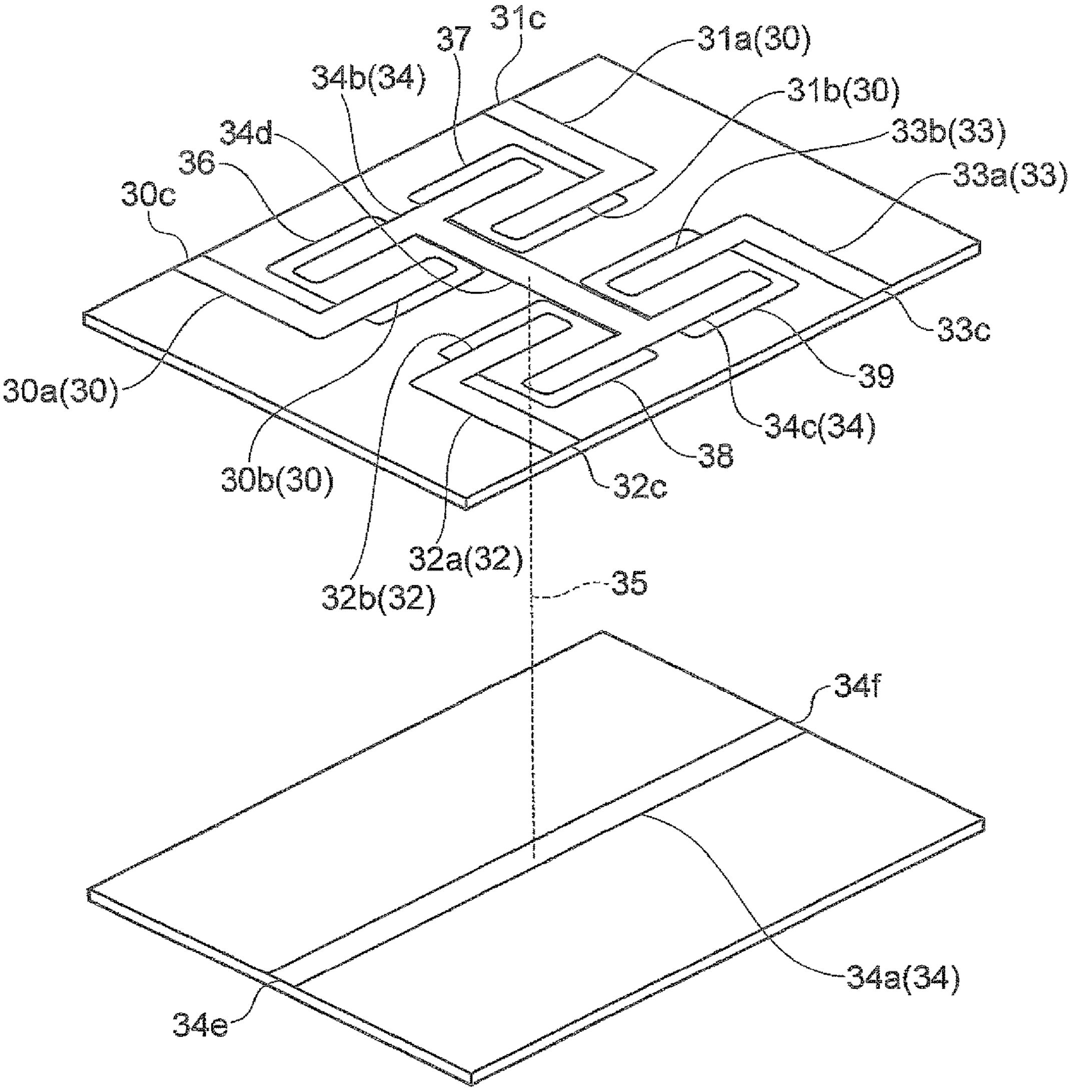
FIG. 7 is an exploded perspective view illustrating the structure of a portion including first to fourth discharging portions in an element body according to the second embodiment.
Figure 8:
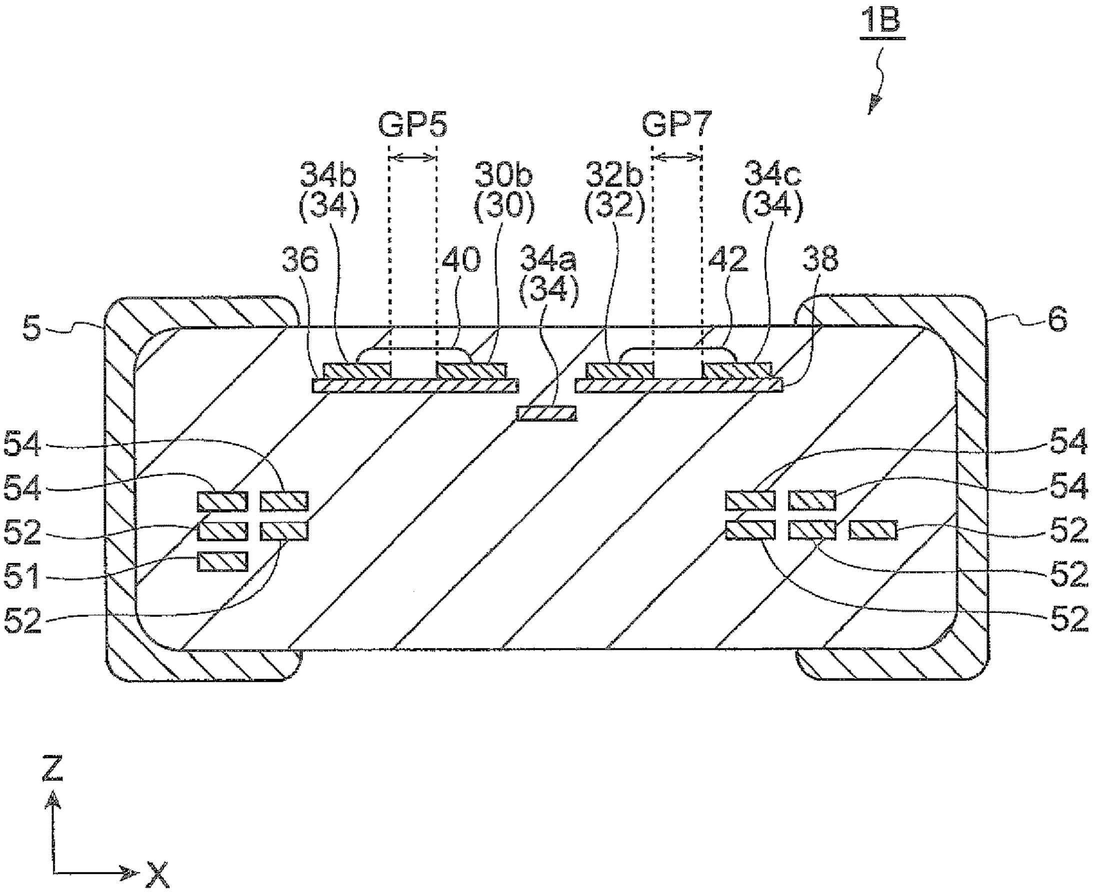
FIG. 8 is a view illustrating the structure of a cross section including the first discharging portion and the third discharging portion in the ESD protection component according to the second embodiment.
Figure 9:
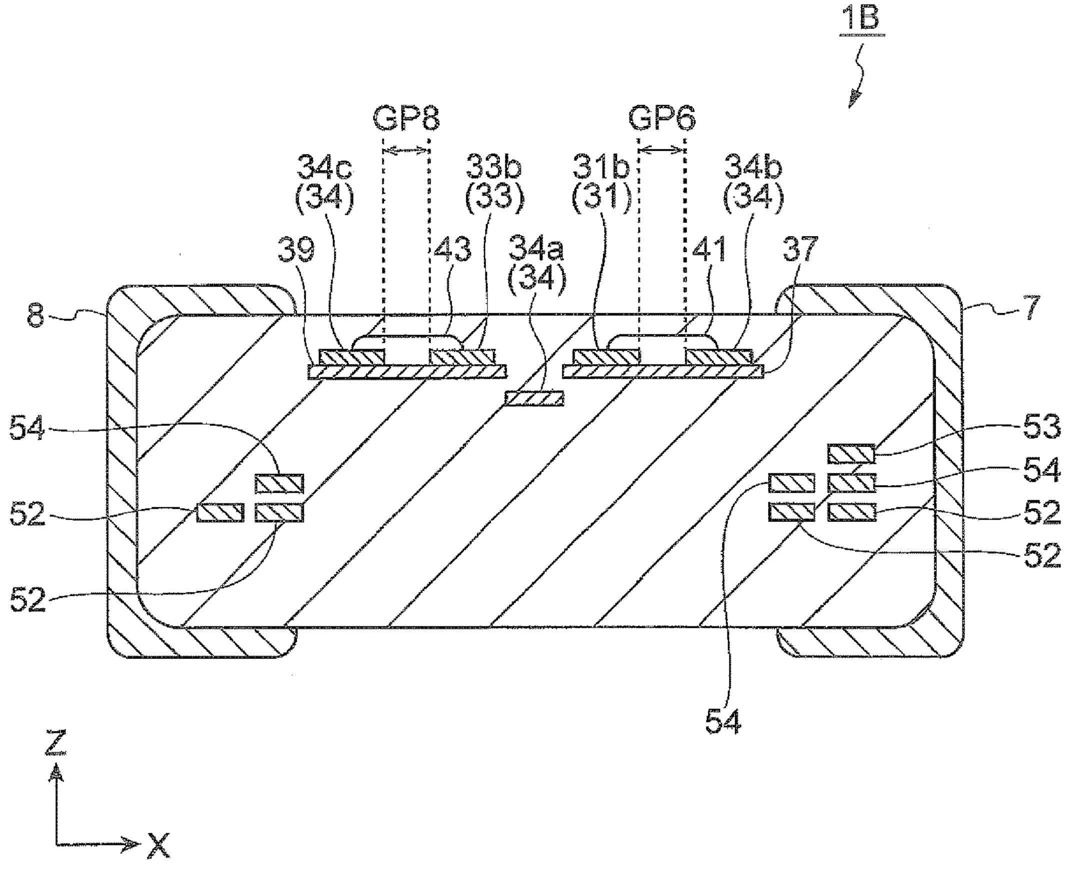
FIG. 9 is a view illustrating the structure of a cross section including the second discharging portion and the fourth discharging portion in the ESD protection component according to the second embodiment.

Next, with reference to FIGS. 1, 2 and 7 to 9, the structure of an ESD protection component according to a second embodiment will be described. FIG. 7 is an exploded perspective view illustrating the structure of a portion including first to fourth discharging portions in a element body according to the second embodiment. FIG. 8 is a view illustrating the structure of a cross section including the first discharging portion and the third discharging portion in the ESD protection component according to the second embodiment. FIG. 9 is a view illustrating the structure of a cross section including the second discharging portion and the fourth discharging portion in the ESD protection component according to the second embodiment.

The ESD protection component LB according to the second embodiment includes a element body 4, external electrodes 5 to 10, and coils L1 and L2, similarly to the ESD protection component 1A according to the first embodiment. The element body 4, the external electrodes 5 to 10 and the coils L1 and L2 have the same structures as those in the first embodiment (see FIGS. 1 and 2). As illustrated in FIGS. 7 to 9, in the ESD protection component 1B according to the second embodiment, the portion including the first to fourth discharging portions has a different structure from that of the ESD protection component 1A according to the first embodiment. More specifically, instead of the opposite electrodes 12, 14, 16 and 18, the ground electrode 20, the first discharging portion GP1, the second discharging portion GP2, the third discharging portion GP3 and the fourth discharging portion GP4, the discharge inducing portions 24 and 25, and the cavity portions 26 to 29, the ESD protection component 1B includes opposite electrodes 30, 31, 32 and 33, a ground electrode 34, a first discharging portion GP5, a second discharging portion GP6, a third discharging portion GP7 and a fourth discharging portion GP8, discharge inducing portions 36 to 39, and cavity portions 40 to 43.

The opposite electrode 30 is placed at a position closer to the end surface 4*a* than to the end surface 4*b* in the longitudinal direction of the element body 4 and, also, at a position closer to the side surface 4*e* than to the side surface 4*f* in the widthwise direction of the element body 4. The opposite electrode 30 has an L shape. The opposite electrode 30 has a first extraction portion 30*a* and a first opposite portion 30*b*. The first extraction portion 30*a* and the first opposite portion 30*b* are placed on the same insulator layer 11. The first extraction portion 30*a* extends in the widthwise direction of the element body 4. The first extraction portion 30*a* has an end portion 30*c* which is exposed in the side surface 4*e* of the element body 4 and is connected to the external electrode 5. The first opposite portion 30*b* extends in the longitudinal direction of the element body 4.

The opposite electrode 31 is placed at a position closer to the end surface 4*b* than to the end surface 4*a* in the longitudinal direction of the element body 4 and, also, at a position closer to the side surface 4*e* than to the side surface 4*f* in the widthwise direction of the element body 4. The opposite electrode 31 has an L shape. The opposite electrode 31 has a first extraction portion 31*a* and a first opposite portion 31*b*. The first extraction portion 31*a* and the first opposite portion 31*b* are both placed on the same insulator layer 11 as the layer on which the first opposite portion 30*b* of the opposite electrode 30 is placed. Namely, the first extraction portion 31*a* and the first opposite portion 31*b* are placed on the same insulator layer 11. The first extraction portion 31*a* extends in the widthwise direction of the element body 4. The first extraction portion 31*a* has an end portion 31*c* which is exposed in the side surface 4*e* of the element body 4 and is connected to the external electrode 7. The first opposite portion 31*b* extends in the longitudinal direction of the element body 4.

The opposite electrode 32 is placed at a position closer to the end surface 4*a* than to the end surface 4*b* in the longitudinal direction of the element body 4 and, also, at a position closer to the side surface 4*f* than to the side surface 4*e* in the widthwise direction of the element body 4. The opposite electrode 32 has an L shape. The opposite electrode 32 has a first extraction portion 32*a* and a first opposite portion 32*b*. The first extraction portion 32*a* and the first opposite portion 32*b* are both placed on the same insulator layer 11 as the layer on which the first opposite portion 30*b* of the opposite electrode 30 is placed. Namely, the first extraction portion 32*a* and the first opposite portion 32*b* are placed on the same insulator layer 11. The first extraction portion 32*a* extends in the widthwise direction of the element body 4. The first extraction portion 32*a* has an end portion 32*c* which is exposed in the side surface 4*f* of the element body 4 and is connected to the external electrode 6.

The first opposite portion 32*b* extends in the longitudinal direction of the element body 4.

The opposite electrode 33 is placed at a position closer to the end surface 4*b* than to the end surface 4*a* in the longitudinal direction of the element body 4 and, also, at a position closer to the side surface 4*f* than to the side surface 4*e* in the widthwise direction of the element body 4. The opposite electrode 33 has an L shape. The opposite electrode 33 has a first extraction portion 33*a* and a first opposite portion 33*b*. The first extraction portion 33*a* and the first opposite portion 33*b* are both placed on the same insulator layer 11 as the layer on which the first opposite portion 30*b* of the opposite electrode 30 is placed. Namely, the first extraction portion 33*a* and the first opposite portion 33*b* are placed on the same insulator layer 11. The first extraction portion 33*a* extends in the widthwise direction of the element body 4. The first extraction portion 33*a* has an end portion 33*c* which is exposed in the side surface 4*f* of the element body 4 and is connected to the external electrode 8. The first opposite portion 33*b* extends in the longitudinal direction of the element body 4.

The ground electrode 34 includes a second extraction portion 34*a*, a second opposite portion 34*b* and a second opposite portion 34*c*. The second extraction portion 34*a* is placed on a different insulator layer 11 from the layer on which the first opposite portion 30*b* of the opposite electrode 30 is placed, and the second opposite portion 34*b* and the second opposite portion 34*c* are placed on the same insulator layer 11 as the layer on which the first opposite portion 30*b* of the opposite electrode 30 is placed. Namely, the second extraction portion 34*a*, and the second opposite portion 34*b* and the second opposite portion 34*c* are placed on the respective different insulator layers 11.

The second extraction portion 34*a* is placed at a substantially-center position in the widthwise direction of the element body 4 and is extended in the longitudinal direction of the element body 4. The second extraction portion 34*a* has an end portion 34*e* which is exposed in the end surface 4*a* of the element body 4 and is connected to the external electrode 9. The second extraction portion 34*a* also has an end portion 34*f* which is exposed in the end surface 4*b* of the element body 4 and is connected to the external electrode 10.

The second opposite portion 34*b* and the second opposite portion 34*c* are spaced apart from each other and are extended in the longitudinal direction of the element body 4. A substantially-center portion of the second opposite portion 34*b* in the direction of the extension thereof and a substantially-center portion of the second opposite portion 34*c* in the direction of the extension thereof are connected to each other to form a connection portion 34*d*. The connection portion 34*d* extends in the widthwise direction of the element body 4. The connection portion 34*d* is electrically connected to the second extraction portion 34*a* via a through hole conductor 35. Thus, the second opposite portion 34*b* and the second opposite portion 34*c* are electrically connected to the second extraction portion 34*a* via the through hole conductor 35. The second opposite portion 34*b*, the second opposite portion 34*c* and the connection portion 34*d* form an H-shaped conductor pattern on the same insulator layer 11.

The side surface 4*e* (the exterior surface of the element body 4) has a region in which the first extraction portion 30*a* and the first extraction portion 31*a* are exposed. The second opposite portion 34*b* is placed at a position closer to the region in which the first extraction portion 30*a* and the first extraction portion 31*a* are exposed, than the first opposite portion 30*b* of the opposite electrode 30 and the first opposite portion 31*b* of the opposite electrode 31. Namely, the first opposite portions 30*b* and 31*b* are placed to be spaced apart from the side surface 4*e* of the element body 4 more largely than the second opposite portion 34*b*. The length of the first extraction portion 30*a* from the side surface 4*e* of the element body 4 to the first opposite portion 30*b* is namely the distance from the portion of the opposite electrode 30 which is exposed in the side surface 4*e* of the element body 4 to the first opposite portion 30*b*. The length of the first extraction portion 31*a* from the side surface 4*e* of the element body 4 to the first opposite portion 31*b* is namely the distance from the portion of the opposite electrode 31 which is exposed in the side surface 4*e* of the element body 4 to the first opposite portion 31*b*.

The second opposite portion 34*b* is placed to face the first opposite portion 30*b* of the opposite electrode 30 and the first opposite portion 31*b* of the opposite electrode 31, in such a way as to be spaced apart therefrom. Thus, the first discharging portion GP5 is formed between the first opposite portion 30*b* of the opposite electrode 30 and the second opposite portion 34*b* of the ground electrode 34 (see FIG. 8), and the second discharging portion GP6 is formed between the first opposite portion 31*b* of the opposite electrode 31 and the second opposite portion 34*b* of the ground electrode 34 (see FIG. 9). With this structure, if a voltage with a magnitude which is equal to or more than a predetermined value is applied between the external electrode 5 and the external electrode 9, discharging is induced in the first discharging portion GP5. Similarly, if a voltage with a magnitude which is equal to or more than a predetermined value is applied between the external electrode 7 and the external electrode 10, discharging is induced in the second discharging portion GP6.

The side surface 4*f* (the exterior surface of the element body 4) has a region in which the first extraction portion 32*a* and the first extraction portion 33*a* are exposed. The second opposite portion 34*c* is placed at a position closer to the region in which the first extraction portion 32*a* and the first extraction portion 33*a* are exposed, than the first opposite portion 32*b* of the opposite electrode 32 and the first opposite portion 33*b* of the opposite electrode 33. Namely, the first opposite portions 32*b* and 33*b* are placed to be spaced apart from the side surface 4*f* of the element body 4 more largely than the second opposite portion 34*c*. The length of the first extraction portion 32*a* from the side surface 4*f* of the element body 4 to the first opposite portion 32*b* is namely the distance from the portion of the opposite electrode 32 which is exposed in the side surface 4*f* of the element body 4 to the first opposite portion 32*b*. The length of the first extraction portion 33*a* from the side surface 4*f* of the element body 4 to the first opposite portion 33*b* is namely the distance from the portion of the opposite electrode 33 which is exposed in the side surface 4*f* of the element body 4 to the first opposite portion 33*b*.

The second opposite portion 34*c* is placed to face the first opposite portion 32*b* of the opposite electrode 32 and the first opposite portion 33*b* of the opposite electrode 33, in such a way as to be spaced apart therefrom. Thus, the third discharging portion GP7 is formed between the first opposite portion 32*b* of the opposite electrode 32 and the second opposite portion 34*c* of the ground electrode 34 (see FIG. 8), and the fourth discharging portion GP8 is formed between the first opposite portion 33*b* of the opposite electrode 33 and the second opposite portion 34*c* of the ground electrode 34 (see FIG. 9). With this structure, if a voltage with a magnitude which is equal to or more than a predetermined value is applied between the external electrode 6 and the external electrode 9, discharging is induced in the third discharging portion GP7. Similarly, if a voltage with a magnitude which is equal to or more than a predetermined value is applied between the external electrode 8 and the external electrode 10, discharging is induced in the fourth discharging portion GP8.

The discharge inducing portion 36 is positioned for the first discharging portion GP5 and has the function of facilitating the occurrence of discharge in the first discharging portion GP5. The discharge inducing portion 36 connects the first opposite portion 30*b* of the opposite electrode 30 to the second opposite portion 34*b* of the ground electrode 34. The discharge inducing portion 37 is positioned for the second discharging portion GP6 and has the function of facilitating the occurrence of discharge in the second discharging portion GP6. The discharge inducing portion 37 connects the first opposite portion 31*b* of the opposite electrode 31 to the second opposite portion 34*b* of the ground electrode 34.

The discharge inducing portion 38 is positioned for the third discharging portion GP7 and has the function of facilitating the occurrence of discharge in the third discharging portion GP7. The discharge inducing portion 38 connects the first opposite portion 32*b* of the opposite electrode 32 to the second opposite portion 34*c* of the ground electrode 34. The discharge inducing portion 39 is positioned for the fourth discharging portion GP8 and has the function of facilitating the occurrence of discharge in the fourth discharging portion GP8. The discharge inducing portion 39 connects the first opposite portion 33*b* of the opposite electrode 33 to the second opposite portion 34*c* of the ground electrode 34.

The cavity portion 40 is formed for the first discharging portion GP5. The cavity portion 40 has the function of absorbing thermal expansions of the first opposite portion 30*b*, the second opposite portion 34*b*, the insulator layer 11 and the discharge inducing portion 36 during discharging. The cavity portion 41 is formed for the second discharging portion GP6. The cavity portion 41 has the function of absorbing thermal expansions of the first opposite portion 31*b*, the second opposite portion 34*b*, the insulator layer 11 and the discharge inducing portion 37 during discharging. The cavity portion 42 is formed for the third discharging portion GP7. The cavity portion 42 has the function of absorbing thermal expansions of the first opposite portion 32*b*, the second opposite portion 34*c*, the insulator layer 11 and the discharge inducing portion 38, during discharging. The cavity portion 43 is formed for the fourth discharging portion GP8. The cavity portion 43 has the function of absorbing thermal expansions of the first opposite portion 33*b*, the second opposite portion 34*c*, the insulator layer 11 and the discharge inducing portion 39, during discharging.

As described above, the ESD protection component 1B according to the present embodiment also offers the same effects as those of the aforementioned embodiment. Namely, the second extraction portion 34*a* and the second opposite portions 34*b* and 34*c* of the ground electrode 34, in the opposite electrodes 30, 31, 32 and 33 and the ground electrode 34, are placed on the respective different layers and are electrically connected to each other via the through hole conductor 35. This makes the total area of the electrodes existing on the same layer smaller. This can enhance the adherence between the insulator layers 11, which can reduce the possibility of occurrences of structural defects, thereby suppressing the infiltration of the plating solution through such defects. This can suppress the infiltration of the plating solution into the first discharging portion GP5 formed between the first opposite portion 30*b* of the opposite electrode 30 and the second opposite portion 34*b* of the ground electrode 34, the second discharging portion GP6 formed between the first opposite portion 31*b* of the opposite electrode 31 and the second opposite portion 34*b* of the ground electrode 34, the third discharging portion GP7 formed between the first opposite portion 32*b* of the opposite electrode 32 and the second opposite portion 34*c* of the ground electrode 34, and the fourth discharging portion GP8 formed between the first opposite portion 33*b* of the opposite electrode 33 and the second opposite portion 34*c* of the ground electrode 34.

Particularly, in the present embodiment, the second extraction portion 34*a* of the ground electrode 34 is placed on the other layer than the layer on which the first opposite portions 30*b*, 31*b*, 32*b* and 33*b* of the opposite electrodes 30, 31, 32 and 33 and the second opposite portions 34*b* and 34*c* of the ground electrode 34 are placed, which enables freely determining the conductor patterns of the first opposite portions 30*b*, 31*b*, 32*b* and 33*b* and the second opposite portions 34*b* and 34*c*, regardless of the conductor pattern of the second extraction portion 34*a*, in the layer on which the first opposite portions 30*b*, 31*b*, 32*b* and 33*b* and the second opposite portions 34*b* and 34*c* are placed.

Further, the side surface 4*e* (the exterior surface of the element body 4) has a region in which the first extraction portion 30*a* connected to the first opposite portion 30*b* and the first extraction portion 31*a* connected to the first opposite portion 31*b* are exposed. The second opposite portion 34*b* is placed at a position closer to the region in which the first extraction portion 30*a* connected to the first opposite portion 30*b* and the first extraction portion 31*a* connected to the first opposite portion 31*b* are exposed, than the first opposite portion 30*b* of the opposite electrode 30 and the first opposite portion 31*b* of the opposite electrode 31. The side surface 4*f*(the exterior surface of the element body 4) has a region in which the first extraction portion 32*a* connected to the first opposite portion 32*b* and the first extraction portion 33*a* connected to the first opposite portion 33*b* are exposed. The second opposite portion 34*c* is placed at a position closer to the region in which the first extraction portion 32*a* connected to the first opposite portion 32*b* and the first extraction portion 33*a* connected to the first opposite portion 33*b* are exposed, than the first opposite portion 32*b* of the opposite electrode 32 and the first opposite portion 33*b* of the opposite electrode 33. Namely, the first opposite portions 30*b* and 31*b* are placed to be spaced apart from the side surface 4*e* of the element body 4 more largely than the second opposite portion 34*b*, and the first opposite portions 32*b* and 33*b* are placed to be spaced apart from the side surface 4*f* of the element body 4 more largely than the second opposite portion 34*c*. This increases the lengths of the opposite electrodes 30 to 33 from their portions exposed in the side surfaces 4*e* and 4*f* of the element body 4 to the first opposite portion 30*b*, 31*b*, 32*b* and 33*b*, which can inhibit the plating solution having entered through these exposed portions from infiltrating into the first opposite portions 30*b*, 31*b*, 32*b* and 33*b*. This can suppress the infiltration of the plating solution into the first discharging portion GP5, the second discharging portion GP6, the third discharging portion GP7 and the fourth discharging portion GP8.

Third Embodiment

Figure 10:
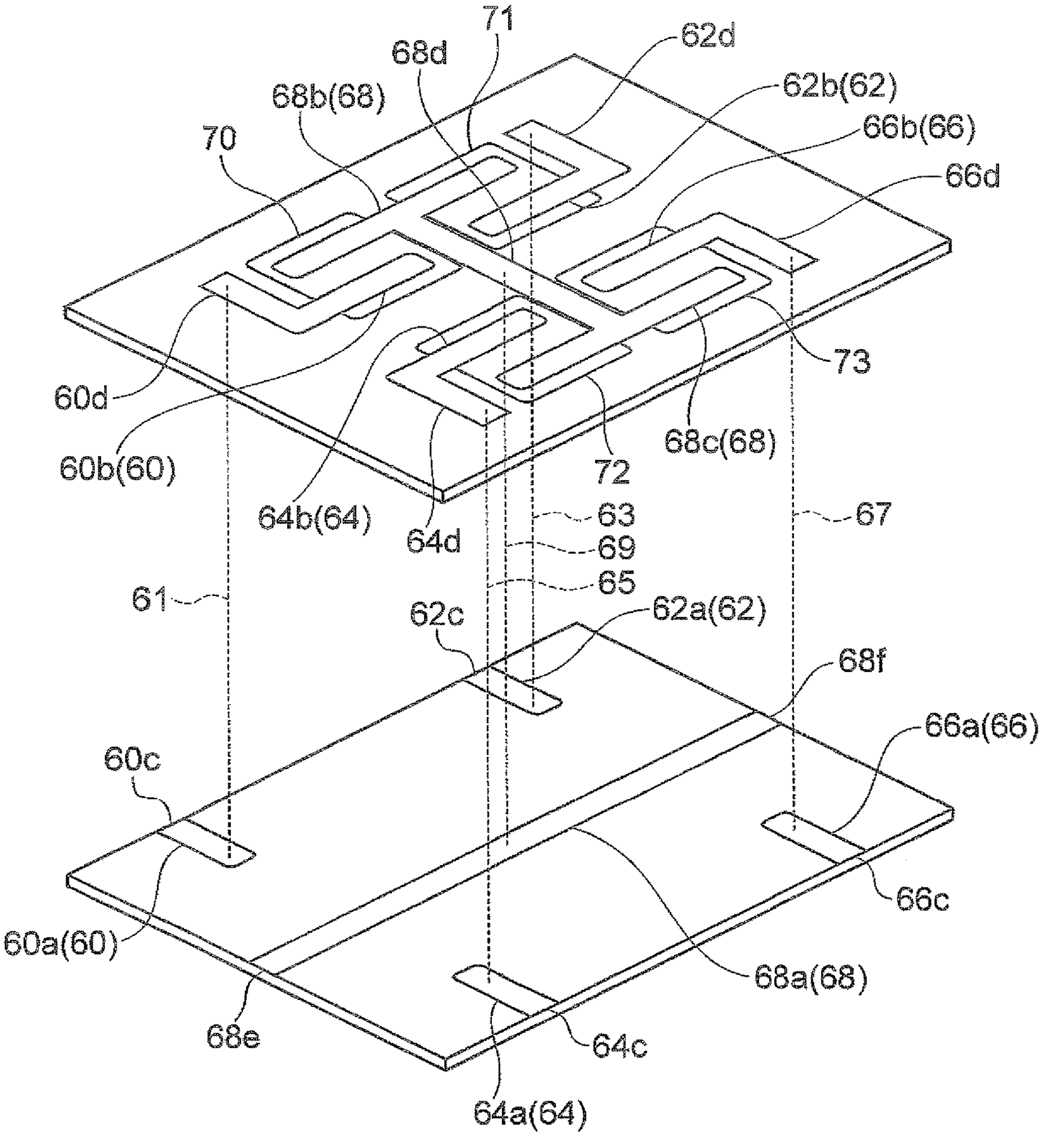
FIG. 10 is an exploded perspective view illustrating the structure of a portion including first to fourth discharging portions in an element body according to the third embodiment.
Figure 11:
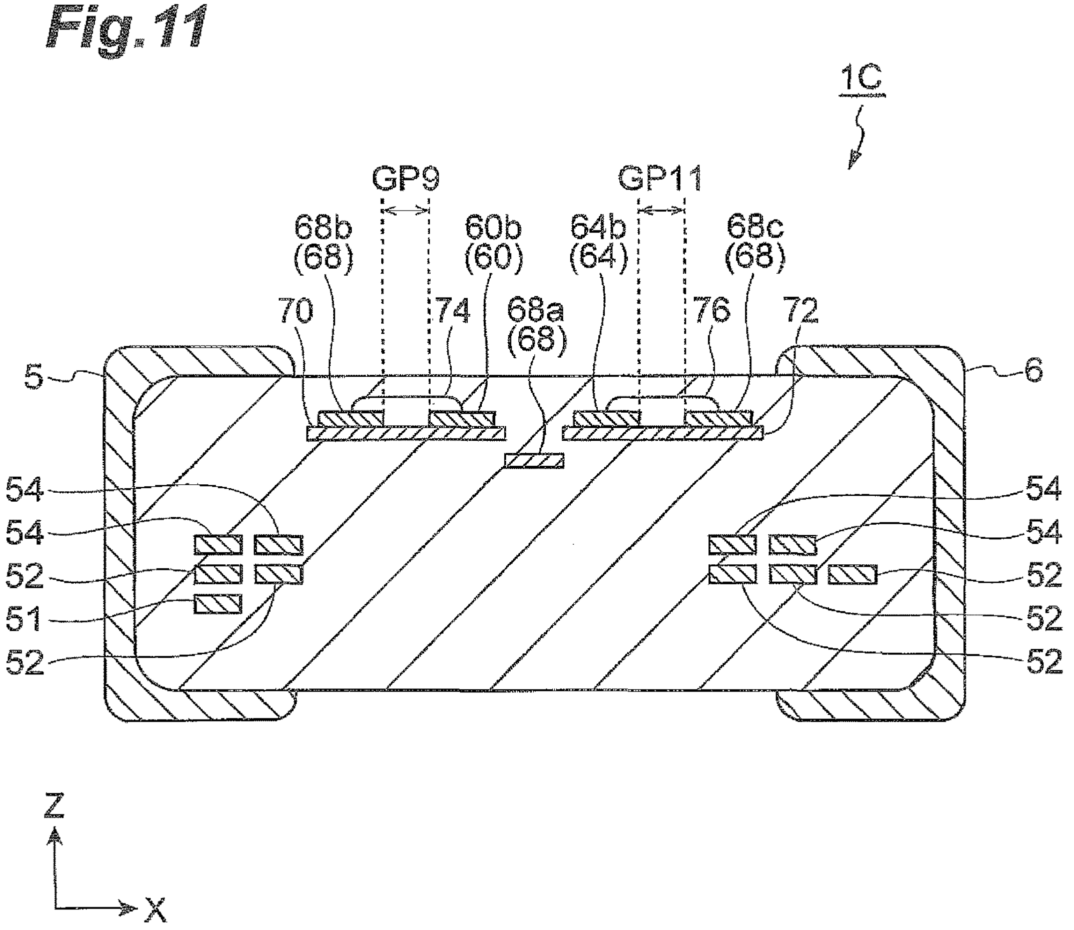
FIG. 11 is a view illustrating the structure of a cross section including the first discharging portion and the third discharging portion in the ESD protection component according to the third embodiment.
Figure 12:
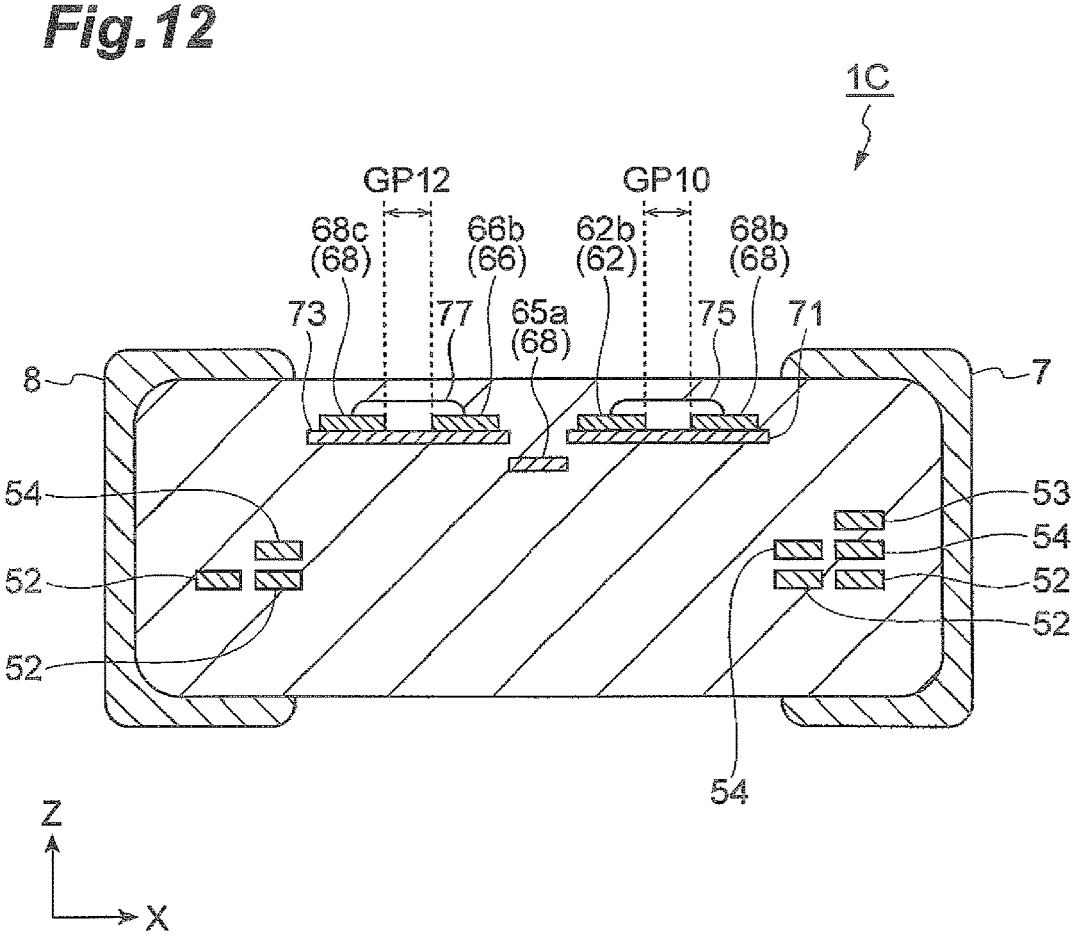
FIG. 12 is a view illustrating the structure of a cross section including the second discharging portion and the fourth discharging portion in the ESD protection component according to the third embodiment.

Next, with reference to FIGS. 1, 2 and 10 to 12, the structure of an ESD protection component according to a third embodiment will be described. FIG. 10 is an exploded perspective view illustrating the structure of a portion including first to fourth discharging portions in a element body according to the third embodiment. FIG. 11 is a view illustrating the structure of a cross section including the first discharging portion and the third discharging portion in the ESD protection component according to the third embodiment. FIG. 12 is a view illustrating the structure of a cross section including the second discharging portion and the fourth discharging portion in the ESD protection component according to the third embodiment.

The ESD protection component 1C according to the third embodiment includes an element body 4, external electrodes 5 to 10, and coils L1 and L2, similarly to the ESD protection component 1A according to the first embodiment. The element body 4, the external electrodes 5 to 10 and the coils L1 and L2 have the same structures as those in the first embodiment (see FIGS. 1 and 2). As illustrated in FIGS. 10 to 12, in the ESD protection component 1C according to the third embodiment, the portion including the first to fourth discharging portions has a different structure from that of the ESD protection component 1A according to the first embodiment, similarly to in the ESD protection component 1B according to the second embodiment. More specifically, instead of the opposite electrodes 12, 14, 16 and 18, the ground electrode 20, the first discharging portion GP1, the second discharging portion GP2, the third discharging portion GP3 and the fourth discharging portion GP4, the discharge inducing portions 24 and 25, and the cavity portions 26 to 29, the ESD protection component 1C includes opposite electrodes 60, 62, 64 and 66, a ground electrode 68, a first discharging portion GP9, a second discharging portion GP10, a third discharging portion GP1 and a fourth discharging portion GP12, discharge inducing portions 70 to 73, and cavity portions 74 to 77.

The opposite electrode 60 is placed at a position closer to the end surface 4*a* than to the end surface 4*b* in the longitudinal direction of the element body 4 and, also, at a position closer to the side surface 4*e* than to the side surface 4*f* in the widthwise direction of the element body 4. The opposite electrode 60 has a first extraction portion 60*a* and a first opposite portion 60*b*. The first extraction portion 60*a* and the first opposite portion 60*b* are placed on respective different insulator layers 11. The first extraction portion 60*a* extends in the widthwise direction of the element body 4. The first extraction portion 60*a* has an end portion 60*c* which is exposed in the side surface 4*e* of the element body 4 and is connected to the external electrode 5. The first opposite portion 60*b* has a portion extending in the longitudinal direction of the element body 4 and a portion extending in the widthwise direction of the element body 4. The portion of the first opposite portion 60*b* which extends in the widthwise direction of the element body 4 forms a connection portion 60*d* at its end. The connection portion 60*d* is electrically connected to the first extraction portion 60*a* via a through hole conductor 61. Thus, the first opposite portion 60*b* is electrically connected to the first extraction portion 60*a* via the through hole conductor 61.

The opposite electrode 62 is placed at a position closer to the end surface 4*b* than to the end surface 4*a* in the longitudinal direction of the element body 4 and, also, at a position closer to the side surface 4*e* than to the side surface 4*f* in the widthwise direction of the element body 4. The opposite electrode 62 has a first extraction portion 62*a* and a first opposite portion 62*b*. The first extraction portion 62*a* is placed on a different insulator layer 11 from the layer on which the first opposite portion 60*b* of the opposite electrode 60 is placed, and the first opposite portion 62*b* is placed on the same insulator layer 11 as the layer on which the first opposite portion 60*b* of the opposite electrode 60 is placed. Namely, the first extraction portion 62*a* and the first opposite portion 62*b* are placed on the respective different insulator layers 11. The first extraction portion 62*a* extends in the widthwise direction of the element body 4. The first extraction portion 62*a* has an end portion 62*c* which is exposed in the side surface 4*e* of the element body 4 and is connected to the external electrode 7. The first opposite portion 62*b* has a portion extending in the longitudinal direction of the element body 4 and a portion extending in the widthwise direction of the element body 4. The portion of the first opposite portion 62*b* which extends in the widthwise direction of the element body 4 forms a connection portion 62*d* at its end. The connection portion 62*d* is electrically connected to the first extraction portion 62*a* via a through hole conductor 63. Thus, the first opposite portion 62*b* is electrically connected to the first extraction portion 62*a* via the through hole conductor 63.

The opposite electrode 64 is placed at a position closer to the end surface 4*a* than to the end surface 4*b* in the longitudinal direction of the element body 4 and, also, at a position closer to the side surface 4*f* than to the side surface 4*e* in the widthwise direction of the element body 4. The opposite electrode 64 has a first extraction portion 64*a* and a first opposite portion 64*b*. The first extraction portion 64*a* is placed on a different insulator layer 11 from the layer on which the first opposite portion 60*b* of the opposite electrode 60 is placed, and the first opposite portion 64*b* is placed on the same insulator layer 11 as the layer on which the first opposite portion 60*b* of the opposite electrode 60 is placed. Namely, the first extraction portion 64*a* and the first opposite portion 64*b* are placed on the respective different insulator layers 11. The first extraction portion 64*a* extends in the widthwise direction of the element body 4. The first extraction portion 64*a* has an end portion 64*c* which is exposed in the side surface 4*f* of the element body 4 and is connected to the external electrode 6. The first opposite portion 64*b* has a portion extending in the longitudinal direction of the element body 4 and a portion extending in the widthwise direction of the element body 4. The portion of the first opposite portion 64*b* which extends in the widthwise direction of the element body 4 forms a connection portion 64*d* at its one end. The connection portion 64*d* is electrically connected to the first extraction portion 64*a* via a through hole conductor 65. Thus, the first opposite portion 64*b* is electrically connected to the first extraction portion 64*a* via the through hole conductor 65.

The opposite electrode 66 is placed at a position closer to the end surface 4*b* than to the end surface 4*a* in the longitudinal direction of the element body 4 and, also, at a position closer to the side surface 4*f* than to the side surface 4*e* in the widthwise direction of the element body 4. The opposite electrode 66 has a first extraction portion 66*a* and a first opposite portion 66*b*. The first extraction portion 66*a* is placed on a different insulator layer 11 from the layer on which the first opposite portion 60*b* of the opposite electrode 60 is placed, and the first opposite portion 66*b* is placed on the same insulator layer 11 as the layer on which the first opposite portion 60*b* of the opposite electrode 60 is placed. Namely, the first extraction portion 66*a* and the first opposite portion 66*b* are placed on the respective different insulator layers 11. The first extraction portion 66*a* extends in the widthwise direction of the element body 4. The first extraction portion 66*a* has an end portion 66*c* which is exposed in the side surface 4*f* of the element body 4 and is connected to the external electrode 8. The first opposite portion 66*b* has a portion extending in the longitudinal direction of the element body 4 and a portion extending in the widthwise direction of the element body 4. The portion of the first opposite portion 66*b* which extends in the widthwise direction of the element body 4 forms a connection portion 66*d* at its end. The connection portion 66*d* is electrically connected to the first extraction portion 66*a* via a through hole conductor 67. Thus, the first opposite portion 66*b* is electrically connected to the first extraction portion 66*a* via the through hole conductor 67.

The ground electrode 68 includes a second extraction portion 68*a*, a second opposite portion 68*b* and a second opposite portion 68*c*. The second extraction portion 68*a* is placed on a different insulator layer 11 from the layer on which the first opposite portion 60*b* of the opposite electrode 60 is placed, and the second opposite portion 68*b* and the second opposite portion 68*c* are placed on the same insulator layer 11 as the layer on which the first opposite portion 60*b* of the opposite electrode 60 is placed. Namely, the second extraction portion 68*a*, and the second opposite portion 68*b* and the second opposite portion 68*c* are placed on the respective different insulator layers 11.

The second extraction portion 68*a* is placed at a substantially-center position in the widthwise direction of the element body 4 and is extended in the longitudinal direction of the element body 4. The second extraction portion 68*a* has an end portion 68*e* which is exposed in the end surface 4*a* of the element body 4 and is connected to the external electrode 9. The second extraction portion 68*a* also has an end portion 68*f* which is exposed in the end surface 4*b* of the element body 4 and is connected to the external electrode 10.

The second opposite portion 68*b* and the second opposite portion 68*c* are spaced apart from each other and are extended in the longitudinal direction of the element body 4. A substantially-center portion of the second opposite portion 68*b* in the direction of the extension thereof and a substantially-center portion of the second opposite portion 68*c* in the direction of the extension thereof are connected to each other to form a connection portion 68*d*. The connection portion 68*d* extends in the widthwise direction of the element body 4. The connection portion 68*d* is electrically connected to the second extraction portion 68*a* via a through hole conductor 69. Thus, the second opposite portion 68*b* and the second opposite portion 68*c* are electrically connected to the second extraction portion 68*a* via the through hole conductor 69. The second opposite portion 68*b*, the second opposite portion 68*c* and the connection portion 68*d* form an H-shaped conductor pattern on the same insulator layer 11.

The second opposite portion 68*b* is placed at a position closer to the side surface 4*e*, which is an exterior surface of the element body 4, than the first opposite portion 60*b* of the opposite electrode 60 and the first opposite portion 62*b* of the opposite electrode 62. Namely, the first opposite portions 60*b* and 62*b* are placed to be spaced apart from the side surface 4*e* of the element body 4 more largely than the second opposite portion 68*b*. The length of the first extraction portion 60*a* from the side surface 4*e* of the element body 4 to the first opposite portion 60*b* is namely the distance from the portion of the opposite electrode 60 which is exposed in the side surface 4*e* of the element body 4 to the first opposite portion 60*b*. The length of the first extraction portion 62*a* from the side surface 4*e* of the element body 4 to the first opposite portion 62*b* is namely the distance from the portion of the opposite electrode 62 which is exposed in the side surface 4*e* of the element body 4 to the first opposite portion 62*b*.

The second opposite portion 68*b* is placed to face the first opposite portion 60*b* of the opposite electrode 60 and the first opposite portion 62*b* of the opposite electrode 62, in such a way as to be spaced apart therefrom. Thus, the first discharging portion GP9 is formed between the first opposite portion 60*b* of the opposite electrode 60 and the second opposite portion 68*b* of the ground electrode 68 (see FIG. 11), and the second discharging portion GP10 is formed between the first opposite portion 62*b* of the opposite electrode 62 and the second opposite portion 68*b* of the ground electrode 68 (see FIG. 12). With this structure, if a voltage with a magnitude which is equal to or more than a predetermined value is applied between the external electrode 5 and the external electrode 9, discharging is induced in the first discharging portion GP9. Similarly, if a voltage with a magnitude which is equal to or more than a predetermined value is applied between the external electrode 7 and the external electrode 10, discharging is induced in the second discharging portion GP10.

The second opposite portion 68*c* is placed at a position closer to the side surface 4*f*, which is an exterior surface of the element body 4, than the first opposite portion 64*b* of the opposite electrode 64 and the first opposite portion 66*b* of the opposite electrode 66. Namely, the first opposite portions 64*b* and 66*b* are placed to be spaced apart from the side surface 4*f* of the element body 4 more largely than the second opposite portion 68*c*. The length of the first extraction portion 64*a* from the side surface 4*f* of the element body 4 to the first opposite portion 64*b* is namely the distance from the portion of the opposite electrode 64 which is exposed in the side surface 4*f* of the element body 4 to the first opposite portion 64*b*. The length of the first extraction portion 66*a* from the side surface 4*f* of the element body 4 to the first opposite portion 66*b* is namely the distance from the portion of the opposite electrode 66 which is exposed in the side surface 4*f* of the element body 4 to the first opposite portion 66*b*.

The second opposite portion 68*c* is placed to face the first opposite portion 64*b* of the opposite electrode 64 and the first opposite portion 66*b* of the opposite electrode 66, in such a way as to be spaced apart therefrom. Thus, the third discharging portion GP11 is formed between the first opposite portion 64*b* of the opposite electrode 64 and the second opposite portion 68*c* of the ground electrode 68 (see FIG. 11), and the fourth discharging portion GP12 is formed between the first opposite portion 64*b* of the opposite electrode 64 and the second opposite portion 68*c* of the ground electrode 68 (see FIG. 12). With this structure, if a voltage with a magnitude which is equal to or more than a predetermined value is applied between the external electrode 6 and the external electrode 9, discharging is induced in the third discharging portion GP11. Similarly, if a voltage with a magnitude which is equal to or more than a predetermined value is applied between the external electrode 8 and the external electrode 10, discharging is induced in the fourth discharging portion GP12.

The discharge inducing portion 70 is positioned for the first discharging portion GP9 and has the function of facilitating the occurrence of discharge in the first discharging portion GP9. The discharge inducing portion 70 connects the first opposite portion 60*b* of the opposite electrode 60 to the second opposite portion 68*b* of the ground electrode 68. The discharge inducing portion 71 is positioned for the second discharging portion GP10 and has the function of facilitating the occurrence of discharge in the second discharging portion GP10. The discharge inducing portion 71 connects the first opposite portion 62*b* of the opposite electrode 62 to the second opposite portion 68*b* of the ground electrode 68.

The discharge inducing portion 72 is positioned for the third discharging portion GP11 and has the function of facilitating the occurrence of discharge in the third discharging portion GP11. The discharge inducing portion 72 connects the first opposite portion 64*b* of the opposite electrode 64 to the second opposite portion 68*c* of the ground electrode 68. The discharge inducing portion 73 is positioned for the fourth discharging portion GP12 and has the function of facilitating the occurrence of discharge in the fourth discharging portion GP12. The discharge inducing portion 73 connects the first opposite portion 66*b* of the opposite electrode 66 to the second opposite portion 68*c* of the ground electrode 68.

The cavity portion 74 is formed for the first discharging portion GP9. The cavity portion 74 has the function of absorbing thermal expansions of the first opposite portion 60*b*, the second opposite portion 68*b*, the insulator layer 11 and the discharge inducing portion 70 during discharging. The cavity portion 75 is formed for the second discharging portion GP10. The cavity portion 75 has the function of absorbing thermal expansions of the first opposite portion 62*b*, the second opposite portion 68*b*, the insulator layer 11 and the discharge inducing portion 71 during discharging. The cavity portion 76 is formed for the third discharging portion GP11. The cavity portion 76 has the function of absorbing thermal expansions of the first opposite portion 64*b*, the second opposite portion 68*c*, the insulator layer 11 and the discharge inducing portion 72, during discharging. The cavity portion 77 is formed for the fourth discharging portion GP12. The cavity portion 77 has the function of absorbing thermal expansions of the first opposite portion 66*b*, the second opposite portion 68*c*, the insulator layer 11 and the discharge inducing portion 73, during discharging.

As described above, the ESD protection component 1C according to the present embodiment also offers the same effects as those of the aforementioned embodiments.

Fourth Embodiment

Figure 13:
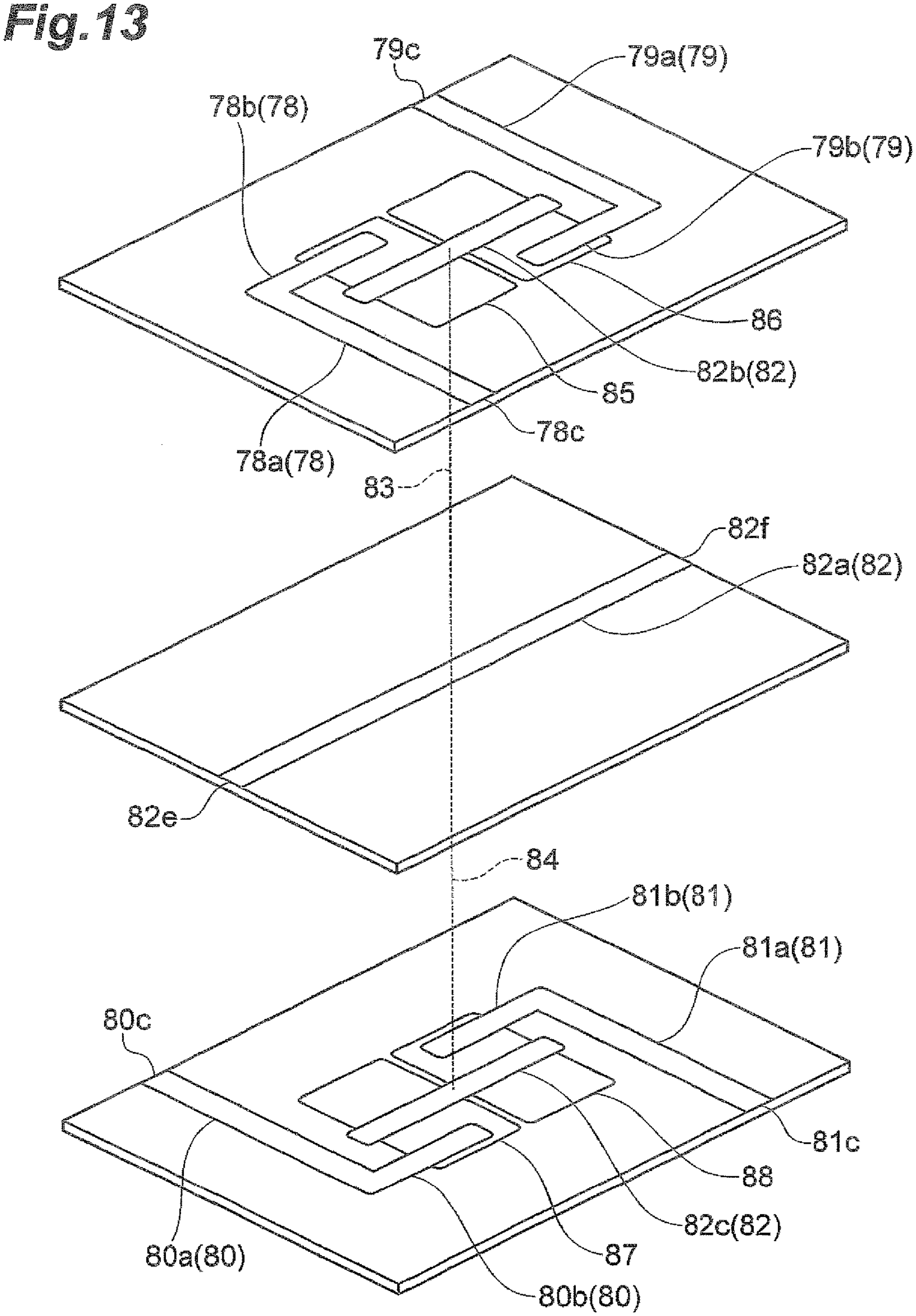
FIG. 13 is an exploded perspective view illustrating the structure of a portion including first to fourth discharging portions in an element body according to the fourth embodiment.
Figure 14:
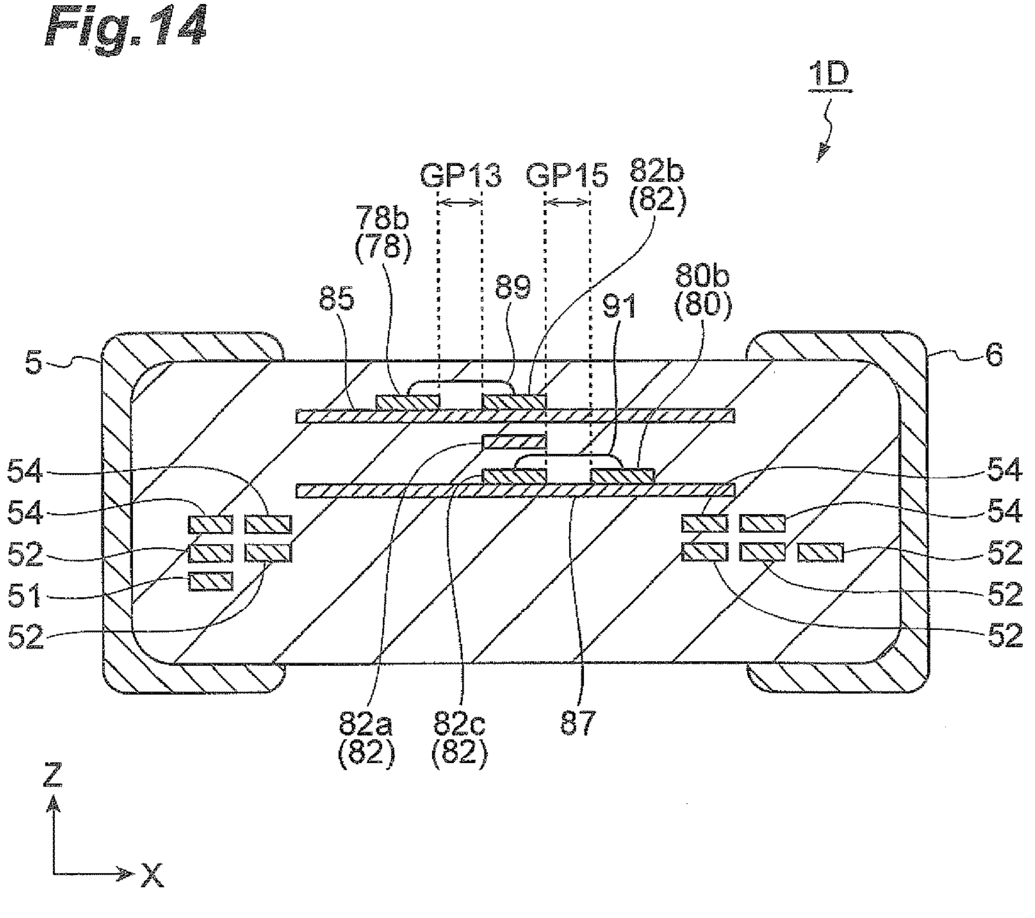
FIG. 14 is a view illustrating the structure of a cross section including the first discharging portion and the third discharging portion in the ESD protection component according to the fourth embodiment.
Figure 15:
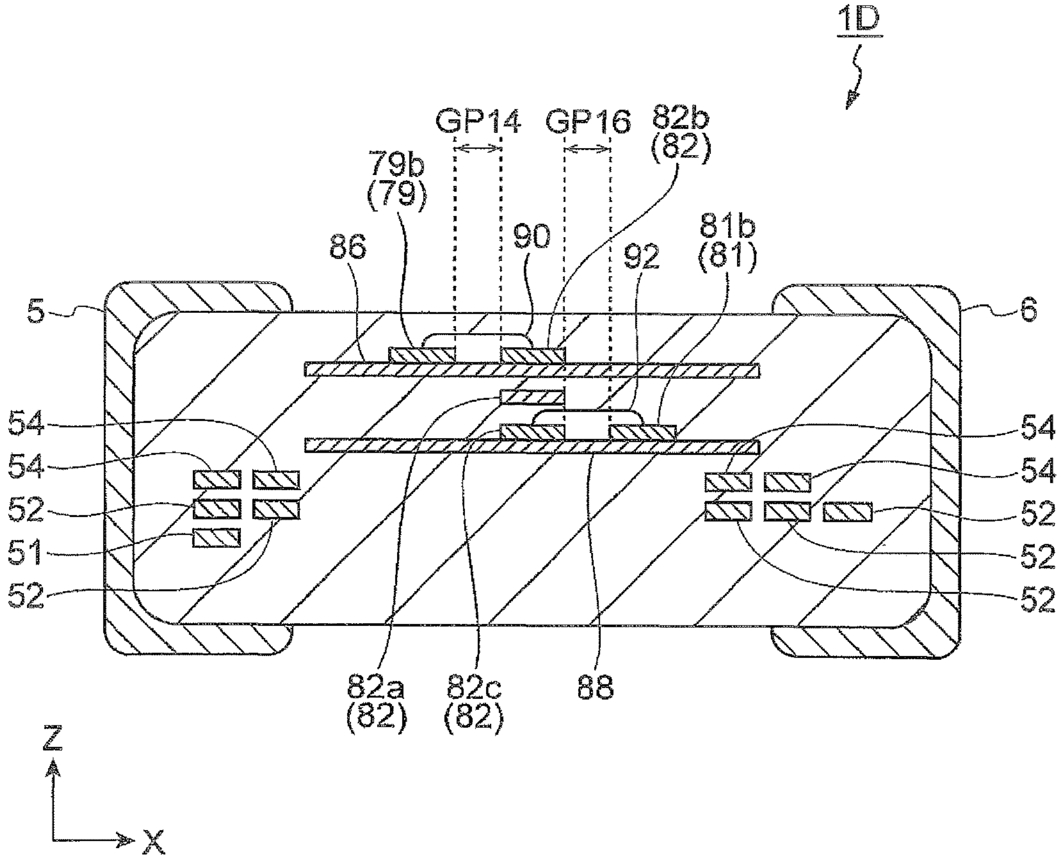
FIG. 15 is a view illustrating the structure of a cross section including the second discharging portion and the fourth discharging portion in the ESD protection component according to the fourth embodiment.

Next, with reference to FIGS. 1, 2 and 13 to 15, the structure of a ESD protection component according to a fourth embodiment will be described. FIG. 13 is an exploded perspective view illustrating the structure of a portion including first to fourth discharging portions in a element body according to the fourth embodiment. FIG. 14 is a view illustrating the structure of a cross section including the first discharging portion and the third discharging portion in the ESD protection component according to the fourth embodiment. FIG. 15 is a view illustrating the structure of a cross section including the second discharging portion and the fourth discharging portion in the ESD protection component according to the fourth embodiment.

The ESD protection component 1D according to the fourth embodiment includes an element body 4, external electrodes 5 to 10, and coils L1 and L2, similarly to the ESD protection component 1A according to the first embodiment. The element body 4, the external electrodes 5 to 10 and the coils L1 and L2 have the same structures as those in the first embodiment (see FIGS. 1 and 2). As illustrated in FIGS. 13 to 15, in the ESD protection component 1D according to the fourth embodiment, the portion including the first to fourth discharging portions has a different structure from that of the ESD protection component 1A according to the first embodiment, similarly to in the ESD protection component 1B and 1C according to the second and third embodiments. More specifically, instead of the opposite electrodes 12, 14, 16 and 18, the ground electrode 20, the first discharging portion GP1, the second discharging portion GP2, the third discharging portion GP3 and the fourth discharging portion GP4, the discharge inducing portions 24 and 25, and the cavity portions 26 to 29, the ESD protection component 1D includes opposite electrodes 78, 79, 80 and 81, a ground electrode 82, a first discharging portion GP13, a second discharging portion GP14, a third discharging portion GP15 and a fourth discharging portion GP16, discharge inducing portions 85 to 88, and cavity portions 89 to 92.

The opposite electrode 78 is placed at a position closer to the end surface 4*a* than to the end surface 4*b* in the longitudinal direction of the element body 4 and, also, at a position closer to the side surface 4*f* than to the side surface 4*e* in the widthwise direction of the element body 4. The opposite electrode 78 has an L shape. The opposite electrode 78 has a first extraction portion 78*a* and a first opposite portion 78*b*. The first extraction portion 78*a* and the first opposite portion 78*b* are placed on the same insulator layer 11. The first extraction portion 78*a* extends in the widthwise direction of the element body 4. The first extraction portion 78*a* has an end portion 78*c* which is exposed in the side surface 4*f* of the element body 4 and is connected to the external electrode 6. The first opposite portion 78*b* extends in the longitudinal direction of the element body 4.

The opposite electrode 79 is placed at a position closer to the end surface 4*b* than to the end surface 4*a* in the longitudinal direction of the element body 4 and, also, at a position closer to the side surface 4*e* than to the side surface 4*f* in the widthwise direction of the element body 4. The opposite electrode 79 has an L shape. The opposite electrode 79 has a first extraction portion 79*a* and a first opposite portion 79*b*. The first extraction portion 79*a* and the first opposite portion 79*b* are both placed on the same insulator layer 11 as the layer on which the first opposite portion 78*b* of the opposite electrode 78 is placed. Namely, the first extraction portion 79*a* and the first opposite portion 79*b* are placed on the same insulator layer 11. The first extraction portion 79*a* extends in the widthwise direction of the element body 4. The first extraction portion 79*a* has an end portion 79*c* which is exposed in the side surface 4*e* of the element body 4 and is connected to the external electrode 7. The first opposite portion 79*b* extends in the longitudinal direction of the element body 4.

The opposite electrode 80 is placed at a position closer to the end surface 4*a* than to the end surface 4*b* in the longitudinal direction of the element body 4 and, also, at a position closer to the side surface 4*e* than to the side surface 4*f* in the widthwise direction of the element body 4. The opposite electrode 80 has an L shape. The opposite electrode 80 has a first extraction portion 80*a* and a first opposite portion 80*b*. The first extraction portion 80*a* and the first opposite portion 80*b* are both placed on a different insulator layer 11 from the layer on which the first extraction portion 78*a* and the first opposite portion 78*b* of the opposite electrode 78 are placed. The first extraction portion 80*a* and the first opposite portion 80*b* are placed on the same insulator layer 11. The first extraction portion 80*a* extends in the widthwise direction of the element body 4. The first extraction portion 80*a* has an end portion 80*c* which is exposed in the side surface 4*e* of the element body 4 and is connected to the external electrode 5. The first opposite portion 80*b* extends in the longitudinal direction of the element body 4.

The opposite electrode 81 is placed at a position closer to the end surface 4*b* than to the end surface 4*a* in the longitudinal direction of the element body 4 and, also, at a position closer to the side surface 4*f* than to the side surface 4*e* in the widthwise direction of the element body 4. The opposite electrode 81 has an L shape. The opposite electrode 81 has a first extraction portion 81*a* and a first opposite portion 81*b*. The first extraction portion 81*a* and the first opposite portion 81*b* are both placed on the same insulator layer 11 as the layer on which the first opposite portion 80*b* of the opposite electrode 80 is placed. Namely, the first extraction portion 81*a* and the first opposite portion 81*b* are placed on the same insulator layer 11. The first extraction portion 81*a* extends in the widthwise direction of the element body 4. The first extraction portion 81*a* has an end portion 81*c* which is exposed in the side surface 4*f* of the element body 4 and is connected to the external electrode 8. The first opposite portion 81*b* extends in the longitudinal direction of the element body 4.

The ground electrode 82 includes a second extraction portion 82*a*, a second opposite portion 82*b* and a second opposite portion 82*c*. The second extraction portion 82*a* is placed on an insulator layer 11 which is different from the layer on which the first opposite portion 78*b* of the opposite electrode 78 is placed and, also, is different from the layer on which the first opposite portion 80*b* of the opposite electrode 80 is placed. The second opposite portion 82*b* is placed on the same insulator layer 11 as the layer on which the first opposite portion 79*b* of the opposite electrode 79 is placed. The second opposite portion 82*c* is placed on the same insulator layer 11 as the layer on which the first opposite portion 80*b* of the opposite electrode 80 is placed. Namely, the second extraction portion 82*a*, the second opposite portion 82*b* and the second opposite portion 82*c* are placed on the respective different insulator layers 11.

The second extraction portion 82*a* is placed at a substantially-center position in the widthwise direction of the bare body 4 and is extended in the longitudinal direction of the element body 4. The second extraction portion 82*a* has an end portion 82*e* which is exposed in the end surface 4*a* of the element body 4 and is connected to the external electrode 9. The second extraction portion 82*a* also has an end portion 82*f* which is exposed in the end surface 4*b* of the element body 4 and is connected to the external electrode 10.

The second opposite portion 82*b* extends in the longitudinal direction of the element body 4. The second opposite portion 82*b* is electrically connected to the second extraction portion 82*a* via a through hole conductor 83. The second opposite portion 82*c* extends in the longitudinal direction of the element body 4. The second opposite portion 82*c* is electrically connected to the second extraction portion 82*a* via a through hole conductor 84.

The side surface 4*f* (exterior surface of the element body 4) has a region in which the first extraction portion 78*a* is exposed. The second opposite portion 82*b* is placed at a position closer to the region in which the first extraction portion 78*a* is exposed, than the first opposite portion 78*b* of the opposite electrode 78. Namely, the first opposite portion 78*b* is placed to be spaced apart from the side surface 4*f*, which is an exterior surface of the element body 4, more largely than the second opposite portion 82*b*. The length of the first extraction portion 78*a* from the side surface 4*f* of the element body 4 to the first opposite portion 78*b* is namely the distance from the portion of the opposite electrode 78 which is exposed in the side surface 4*f* of the element body 4 to the first opposite portion 78*b*.

The side surface 4*e* (the exterior surface of the element body 4) has a region in which the first extraction portion 79*a* is exposed. The second opposite portion 82*b* is placed at a position closer to the region in which the first extraction portion 79*a* is exposed, than the first opposite portion 79*b* of the opposite electrode 79. Namely, the first opposite portion 79*b* is placed to be spaced apart from the side surface 4*e*, which is an exterior surface of the element body 4, more largely than the second opposite portion 82*b*. The length of the first extraction portion 79*a* from the side surface 4*e* of the element body 4 to the first opposite portion 79*b* is namely the distance from the portion of the opposite electrode 79 which is exposed in the side surface 4*e* of the element body 4 to the first opposite portion 79*b*.

The second opposite portion 82*b* is placed to face the first opposite portion 78*b* of the opposite electrode 78 and the first opposite portion 79*b* of the opposite electrode 79, in such a way as to be spaced apart therefrom. Thus, the first discharging portion GP13 is formed between the first opposite portion 78*b* of the opposite electrode 78 and the second opposite portion 82*b* of the ground electrode 82 (see FIG. 14), and the second discharging portion GP14 is formed between the first opposite portion 79*b* of the opposite electrode 79 and the second opposite portion 82*b* of the ground electrode 82 (see FIG. 15). With this structure, if a voltage with a magnitude which is equal to or more than a predetermined value is applied between the external electrode 6 and the external electrode 9, discharging is induced in the first discharging portion GP13. Similarly, if a voltage with a magnitude which is equal to or more than a predetermined value is applied between the external electrode 7 and the external electrode 10, discharging is induced in the second discharging portion GP14.

The side surface 4*e* (the exterior surface of the element body 4) has a region in which the first extraction portion 80*a* is exposed. The second opposite portion 82*c* is placed at a position closer to the region in which the first extraction portion 80*a* is exposed, than the first opposite portion 80*b* of the opposite electrode 80. Namely, the first opposite portion 80*b* is placed to be spaced apart from the side surface 4*e*, which is an exterior surface of the element body 4, more largely than the second opposite portion 82*c*. The length of the first extraction portion 80*a* from the side surface 4*e* of the element body 4 to the first opposite portion 80*b* is namely the distance from the portion of the opposite electrode 80 which is exposed in the side surface 4*e* of the element body 4 to the first opposite portion 80*b*.

The side surface 4*f* (the exterior surface of the element body 4) has a region in which the first extraction portion 81*a* is exposed. The second opposite portion 82*c* is placed at a position closer to the region in which the first extraction portion 81*a* is exposed, than the first opposite portion 81*b* of the opposite electrode 81. Namely, the first opposite portion 81*b* is placed to be spaced apart from the side surface 4*f*, which is an exterior surface of the element body 4, more largely than the second opposite portion 82*c*. The length of the first extraction portion 81*a* from the side surface 4*f* of the element body 4 to the first opposite portion 81*b* is namely the distance from the portion of the opposite electrode 81 which is exposed in the side surface 4*f* of the element body 4 to the first opposite portion 81*b*.

The second opposite portion 82*c* is placed to face the first opposite portion 80*b* of the opposite electrode 80 and the first opposite portion 81*b* of the opposite electrode 81, in such a way as to be spaced apart therefrom. Thus, the third discharging portion GP15 is formed between the first opposite portion 80*b* of the opposite electrode 80 and the second opposite portion 82*c* of the ground electrode 82 (see FIG. 14), and the fourth discharging portion GP16 is formed between the first opposite portion 81*b* of the opposite electrode 81 and the second opposite portion 82*c* of the ground electrode 82 (see FIG. 15). With this structure, if a voltage with a magnitude which is equal to or more than a predetermined value is applied between the external electrode 5 and the external electrode 9, discharging is induced in the third discharging portion GP15. Similarly, if a voltage with a magnitude which is equal to or more than a predetermined value is applied between the external electrode 8 and the external electrode 10, discharging is induced in the fourth discharging portion GP16.

The discharge inducing portion 85 is positioned for the first discharging portion GP13 and has the function of facilitating the occurrence of discharge in the first discharging portion GP13. The discharge inducing portion 85 connects the first opposite portion 78*b* of the opposite electrode 78 to the second opposite portion 82*b* of the ground electrode 82. The discharge inducing portion 86 is positioned for the second discharging portion GP14 and has the function of facilitating the occurrence of discharge in the second discharging portion GP14. The discharge inducing portion 86 connects the first opposite portion 79*b* of the opposite electrode 79 to the second opposite portion 82*b* of the ground electrode 82.

The discharge inducing portion 87 is positioned for the third discharging portion GP15 and has the function of facilitating the occurrence of discharge in the third discharging portion GP15. The discharge inducing portion 87 connects the first opposite portion 80*b* of the opposite electrode 80 to the second opposite portion 82*c* of the ground electrode 82. The discharge inducing portion 88 is positioned for the fourth discharging portion GP16 and has the function of facilitating the occurrence of discharge in the fourth discharging portion GP16. The discharge inducing portion 88 connects the first opposite portion 81*b* of the opposite electrode 81 to the second opposite portion 82*c* of the ground electrode 82.

The cavity portion 89 is formed for the first discharging portion GP13. The cavity portion 89 has the function of absorbing thermal expansions of the first opposite portion 78*b*, the second opposite portion 82*b*, the insulator layer 11 and the discharge inducing portion 85 during discharging. The cavity portion 90 is formed for the second discharging portion GP14. The cavity portion 90 has the function of absorbing thermal expansions of the first opposite portion 79*b*, the second opposite portion 82*b*, the insulator layer 11 and the discharge inducing portion 86 during discharging. The cavity portion 91 is formed for the third discharging portion GP11. The cavity portion 91 has the function of absorbing thermal expansions of the first opposite portion 80*b*, the second opposite portion 82*c*, the insulator layer 11 and the discharge inducing portion 87, during discharging. The cavity portion 92 is formed for the fourth discharging portion GP12. The cavity portion 92 has the function of absorbing thermal expansions of the first opposite portion 81*b*, the second opposite portion 82*c*, the insulator layer 11 and the discharge inducing portion 88, during discharging.

As described above, the ESD protection component 1D according to the present embodiment also offers the same effects as those of the aforementioned embodiments.

Fifth Embodiment

Figure 16:
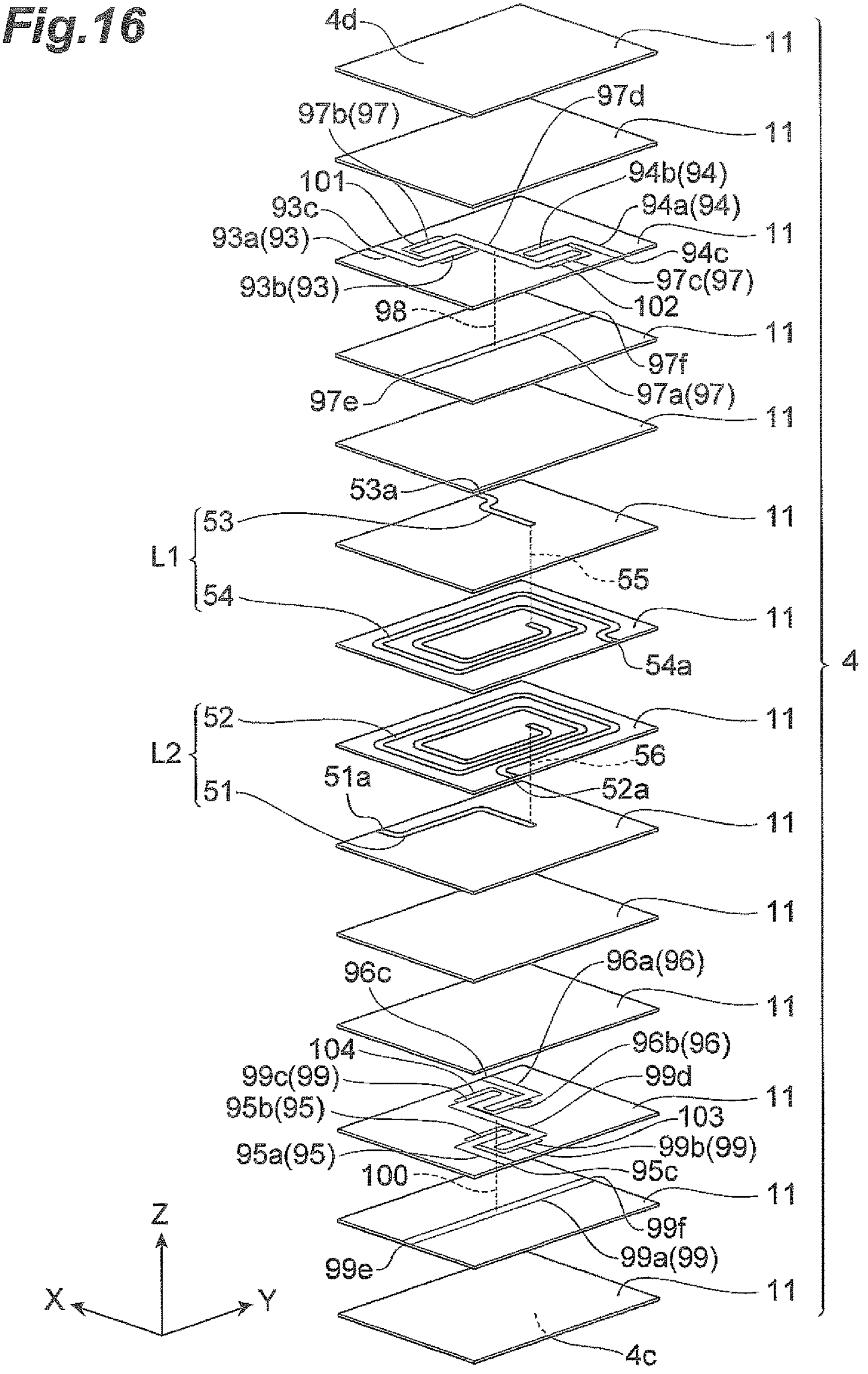
FIG. 16 is an exploded perspective view illustrating the structure of an element body according to a fifth embodiment.
Figure 17:
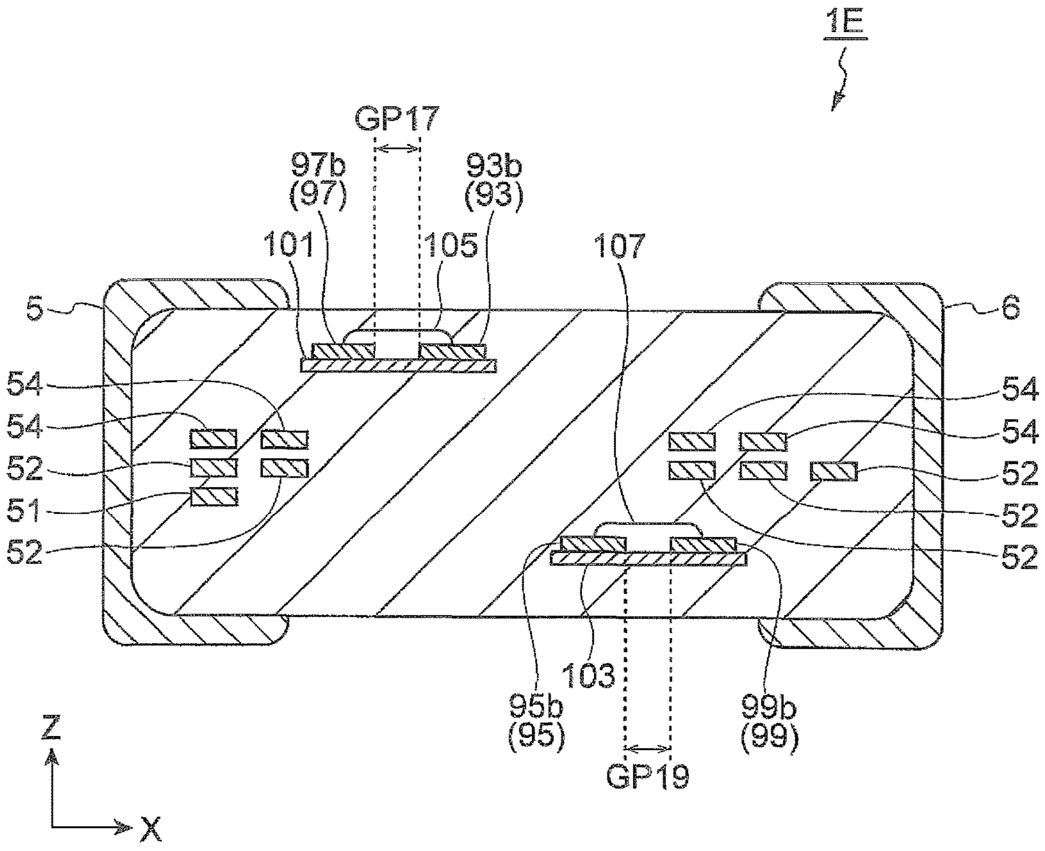
FIG. 17 is a view illustrating the structure of a cross section including a first discharging portion and a third discharging portion in the ESD protection component according to the fifth embodiment.
Figure 18:
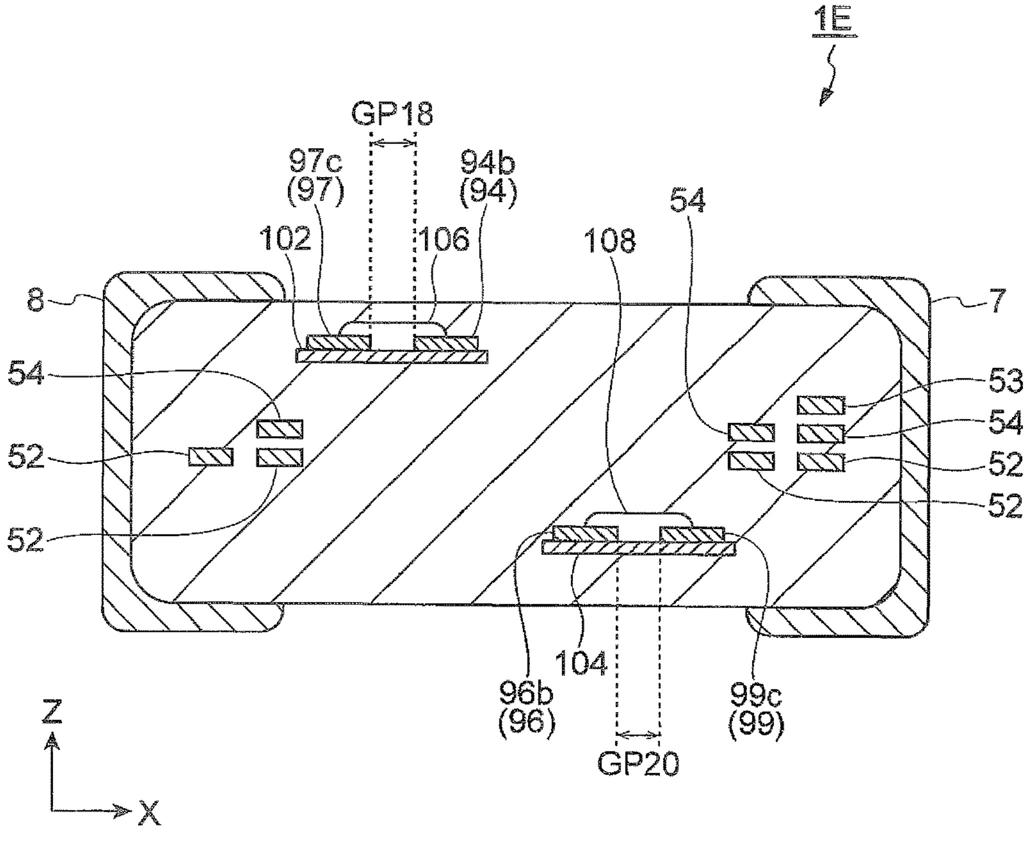
FIG. 18 is a view illustrating the structure of a cross section including a second discharging portion and a fourth discharging portion in the ESD protection component according to the fifth embodiment.

Next, with reference to FIGS. 1 and 16 to 18, the structure of an ESD protection component according to a fifth embodiment will be described. FIG. 16 is an exploded perspective view illustrating the structure of an element body according to the fifth embodiment. FIG. 17 is a view illustrating the structure of a cross section including a first discharging portion and a third discharging portion in the ESD protection component according to the fifth embodiment. FIG. 18 is a view illustrating the structure of a cross section including a second discharging portion and a fourth discharging portion in the ESD protection component according to the fifth embodiment.

The ESD protection component 1E according to the fifth embodiment includes an element body 4, external electrodes 5 to 10, and coils L1 and L2, similarly to the ESD protection component 1A according to the first embodiment. The element body 4, the external electrodes 5 to 10 and the coils L1 and L2 have the same structures as those in the first embodiment (see FIGS. 1 and 2). As illustrated in FIGS. 16 to 18, in the ESD protection component 1E according to the fifth embodiment, the structure of the portion including the first to fourth discharging portions is different from that of the ESD protection component 1A according to the first embodiment. More specifically, in the ESD protection component 1E according to the present embodiment, the positions of the first to fourth discharging portions are placed in both sides with respect to the coils L1 and L2 in the direction of layer lamination, while in the ESD protection component 1A, the positions of the first to fourth discharging portions are placed in one side with respect to the coils L1 and L2 in the stack direction of the plurality of insulator layers. Instead of the opposite electrodes 12, 14, 16 and 18, the ground electrode 20, the first discharging portion GP1, the second discharging portion GP2, the third discharging portion GP3 and the fourth discharging portion GP4, the discharge inducing portions 24 and 25, and the cavity portions 26 to 29 which are included in the ESD protection component 1A, the ESD protection component 1E includes opposite electrodes 93, 94, 95 and 96, ground electrodes 97 and 99, a first discharging portion GP17, a second discharging portion GP18, a third discharging portion GP19 and a fourth discharging portion GP20, discharge inducing portions 101 to 104, and cavity portions 105 to 108.

The opposite electrodes 93 and 94 are placed at a position closer to the side surface 4*d* of the element body 4, than the coils L1 and L2, in the stack of the plurality of insulator layers. The opposite electrode 93 is placed at a position closer to the end surface 4*a* than to the end surface 4*b* in the longitudinal direction of the element body 4 and, also, at a position closer to the side surface 4*e* than to the side surface 4*f* in the widthwise direction of the element body 4. The opposite electrodes 93 have L shape. The opposite electrode 93 has a first extraction portion 93*a* and a first opposite portion 93*b*. The first extraction portion 93*a* and the first opposite portion 93*b* are placed on the same insulator layer 11. The first extraction portion 93*a* extends the widthwise direction of the element body 4. The first extraction portion 93*a* has an end portion 93*c* which is exposed in the side surface 4*e* of the element body 4 and is connected to the external electrode 5. The first opposite portion 93*b* extends in the longitudinal direction of the element body 4.

The opposite electrode 94 is placed at a position closer to the end surface 4*b* than to the end surface 4*a* in the longitudinal direction of the element body 4 and, also, at a position closer to the side surface 4*f* than to the side surface 4*e* in the widthwise direction of the element body 4. The opposite electrodes 94 have L shapes. The opposite electrode 94 has a first extraction portion 94*a* and a first opposite portion 94*b*. The first extraction portion 94*a* and the first opposite portion 94*b* are both placed on the same insulator layer 11 as the layer on which the first opposite portion 93*b* of the opposite electrode 93 is placed. Namely, the first extraction portion 94*a* and the first opposite portion 94*b* are placed on the same insulator layer 11. The first extraction portion 94*a* extends the widthwise direction of the element body 4. The first extraction portion 94*a* has an end portion 94*c* which is exposed in the side surface 4*f* of the element body 4 and is connected to the external electrode 8. The first opposite portion 94*b* extends in the longitudinal direction of the element body 4.

The opposite electrodes 95 and 96 are placed at a position closer to the side surface 4*c* of the element body 4, than the coils L1 and L2, in the stack direction of the plurality of insulator layers. The opposite electrode 95 is placed at a position closer to the end surface 4*a* than to the end surface 4*b* in the longitudinal direction of the element body 4 and, also, at a position closer to the side surface 4*f* than to the side surface 4*e* in the widthwise direction of the element body 4. The opposite electrodes 95 have L shape. The opposite electrode 95 has a first extraction portion 95*a* and a first opposite portion 95*b*. The first extraction portion 95*a* and the first opposite portion 95*b* are both placed on a different insulator layer 11 from the layer on which the first opposite portion 93*b* of the opposite electrode 93 is placed. The first extraction portion 95*a* and the first opposite portion 95*b* are placed on the same insulator layer 11. The first extraction portion 95*a* extends the widthwise direction of the element body 4. The first extraction portion 95*a* has an end portion 95*c* which is exposed in the side surface 4*f* of the element body 4 and is connected to the external electrode 6. The first opposite portion 95*b* extends in the longitudinal direction of the element body 4.

The opposite electrode 96 is placed at a position closer to the end surface 4*b* than to the end surface 4*a* in the longitudinal direction of the element body 4 and, also, at a position closer to the side surface 4*e* than to the side surface 4*f* in the widthwise direction of the element body 4. The opposite electrodes 96 have L shape. The opposite electrode 96 has a first extraction portion 96*a* and a first opposite portion 96*b*. The first extraction portion 96*a* and the first opposite portion 96*b* are both placed on the same insulator layer 11 as the layer on which the first opposite portion 95*b* of the opposite electrode 95 is placed. Namely, the first extraction portion 96*a* and the first opposite portion 96*b* are placed on the same insulator layer 11. The first extraction portion 96*a* extends the widthwise direction of the element body 4. The first extraction portion 96*a* has an end portion 96*c* which is exposed in the side surface 4*e* of the element body 4 and is connected to the external electrode 7. The first opposite portion 96*b* extends in the longitudinal direction of the element body 4.

The ground electrode 97 is placed at a position closer to the side surface 4*d* of the element body 4, than the coils L1 and L2, in the stack direction of the plurality of insulator layers. The ground electrode 97 includes a second extraction portion 97*a*, a second opposite portion 97*b* and a second opposite portion 97*c*. The second extraction portion 97*a* is placed in an insulator layer 11 between the layers on which the coils L1 and L2 are placed, and the layer on which the first opposite portion 93*b* of the opposite electrode 93 and the first opposite portion 94*b* of the opposite electrode 94 are placed. The second opposite portion 97*b* is placed on the same insulator layer 11 as the layer on which the first opposite portion 93*b* of the opposite electrode 93 is placed. The second opposite portion 97*c* is placed on the same insulator layer 11 as the layer on which the first opposite portion 94*b* of the opposite electrode 94 is placed. Namely, the second extraction portion 97*a*, and the second opposite portion 97*b* and the second opposite portion 97*c* are placed on the respective different insulator layers 11.

The second extraction portion 97*a* is placed at a substantially-center position in the widthwise direction of the element body 4 and is extended in the longitudinal direction of the element body 4. The second extraction portion 97*a* has an end portion 97*e* which is exposed in the end surface 4*a* of the element body 4 and is connected to the external electrode 9. The second extraction portion 97*a* also has an end portion 97*f* which is exposed in the end surface 4*b* of the element body 4 and is connected to the external electrode 10.

The second opposite portion 97*b* and the second opposite portion 97*c* are extended in the longitudinal direction of the element body 4 and, also, are bent to extend in the widthwise direction of the element body 4 and are connected to each other to form a connection portion 97*d*, at their respective ends. The connection portion 97*d* is electrically connected to the second extraction portion 97*a* via a through hole conductor 98. Namely, the second opposite portion 97*b* and the second opposite portion 97*c* are electrically connected to the second extraction portion 97*a* via the through hole conductor 98.

The side surface 4*e* (the exterior surface of the element body 4) has a region in which the first extraction portion 93*a* is exposed. The second opposite portion 97*b* is placed at a position closer to the region in which the first extraction portion 93*a* is exposed, than the first opposite portion 93*b* of the opposite electrode 93. Namely, the first opposite portion 93*b* is placed to be spaced apart from the side surface 4*e*, which is an exterior surface of the element body 4, more largely than the second opposite portion 97*b*. The length of the first extraction portion 93*a* from the side surface 4*e* of the element body 4 to the first opposite portion 93*b* is namely the distance from the portion of the opposite electrode 93 which is exposed in the side surface 4*e* of the element body 4 to the first opposite portion 93*b*.

The side surface 4*f* (the exterior surface of the element body 4) has a region in which the first extraction portion 94*a* is exposed. The second opposite portion 97*c* is placed at a position closer to the region in which the first extraction portion 94*a* is exposed, than the first opposite portion 94*b* of the opposite electrode 94. Namely, the first opposite portion 94*b* is placed to be spaced apart from the side surface 4*f*, which is an exterior surface of the element body 4, more largely than the second opposite portion 97*b*. The length of the first extraction portion 94*a* from the side surface 4*f* of the element body 4 to the first opposite portion 94*b* is namely the distance from the portion of the opposite electrode 94 which is exposed in the side surface 4*f* of the element body 4 to the first opposite portion 94*b*.

The second opposite portion 97*b* is placed to face the first opposite portion 93*b* of the opposite electrode 93, in such a way as to be spaced apart therefrom. Thus, the first discharging portion GP17 is formed between the first opposite portion 93*b* of the opposite electrode 93 and the second opposite portion 97*b* of the ground electrode 97 (see FIG. 17). The second opposite portion 97*c* is placed to face the first opposite portion 94*b* of the opposite electrode 94, in such a way as to be spaced apart therefrom. Thus, the second discharging portion GP18 is formed between the first opposite portion 94*b* of the opposite electrode 94 and the second opposite portion 97*c* of the ground electrode 97 (see FIG. 18). With this structure, if a voltage with a magnitude which is equal to or more than a predetermined value is applied between the external electrode 5 and the external electrode 9, discharging is induced in the first discharging portion GP17. Similarly, if a voltage with a magnitude which is equal to or more than a predetermined value is applied between the external electrode 8 and the external electrode 10, discharging is induced in the second discharging portion GP18.

The ground electrode 99 includes a second extraction portion 99*a*, a second opposite portion 99*b* and a second opposite portion 99*c*. The second extraction portion 99*a* is placed on an insulator layer 11 in the side closer to the side surface 4*c* of the element body 4, than the layer on which the first opposite portion 93*b* of the opposite electrode 93 and the first opposite portion 94*b* of the opposite electrode 94 are placed. The second opposite portion 99*b* is placed on the same insulator layer 11 as the layer on which the first opposite portion 95*b* of the opposite electrode 95 is placed. The second opposite portion 99*c* is placed on the same insulator layer 11 as the layer on which the first opposite portion 96*b* of the opposite electrode 96 is placed. Namely, the second extraction portion 99*a*, and the second opposite portion 99*b* and the second opposite portion 99*c* are placed on the respective different insulator layers 11.

The second extraction portion 99*a* is placed at a substantially-center position in the widthwise direction of the element body 4 and is extended in the longitudinal direction of the element body 4. The second extraction portion 99*a* has an end portion 99*e* which is exposed in the end surface 4*a* of the element body 4 and is connected to the esternal electrode 9. The second extraction portion 99*a* also has an end portion 99*f* which is exposed in the end surface 4*b* of the element body 4 and is connected to the external electrode 10.

The second opposite portion 99*b* and the second opposite portion 99*c* are extended in the longitudinal direction of the element body 4 and, also, are bent to extend in the widthwise direction of the element body 4 and are connected to each other to form a connection portion 99*d*, at their respective ends. The connection portion 99*d* is electrically connected to the second extraction portion 99*a* via a through hole conductor 100. Namely, the second opposite portion 99*b* and the second opposite portion 99*c* are electrically connected to the second extraction portion 99*a* via the through hole conductor 100.

The side surface 4*f* (the exterior surface of the element body 4) has a region in which the first extraction portion 95*a* is exposed. The second opposite portion 99*b* is placed at a position closer to the region in which the first extraction portion 95*a* is exposed, than the first opposite portion 95*b* of the opposite electrode 95. Namely, the first opposite portion 95*b* is placed to be spaced apart from the side surface 4*f*, which is an exterior surface of the element body 4, more largely than the second opposite portion 99*b*. The length of the first extraction portion 95*a* from the side surface 4*f* of the element body 4 to the first opposite portion 95*b* is namely the distance from the portion of the opposite electrode 95 which is exposed in the side surface 4*f* of the element body 4 to the first opposite portion 95*b*.

The side surface 4*e* (the exterior surface of the element body 4) has a region in which the first extraction portion 96*a* is exposed. The second opposite portion 99*c* is placed at a position closer to the region in which the first extraction portion 96*a* is exposed, than the first opposite portion 96*b* of the opposite electrode 96. Namely, the first opposite portion 96*b* is placed to be spaced apart from the side surface 4*e*, which is an exterior surface of the element body 4, more largely than the second opposite portion 99*b*. The length of the first extraction portion 96*a* from the side surface 4*e* of the element body 4 to the first opposite portion 96*b* is namely the distance from the portion of the opposite electrode 96 which is exposed in the side surface 4*e* of the element body 4 to the first opposite portion 96*b*.

The second opposite portion 99*b* is placed to face the first opposite portion 95*b* of the opposite electrode 95, in such a way as to be spaced apart therefrom. Thus, the third discharging portion GP19 is formed between the first opposite portion 95*b* of the opposite electrode 95 and the second opposite portion 99*b* of the ground electrode 99 (see FIG. 17). The second opposite portion 99*c* is placed to face the first opposite portion 96*b* of the opposite electrode 96, in such a way as to be spaced apart therefrom. Thus, the fourth discharging portion GP20 is formed between the first opposite portion 96*b* of the opposite electrode 96 and the second opposite portion 99*c* of the ground electrode 99 (see FIG. 18). With this structure, if a voltage with a magnitude which is equal to or more than a predetermined value is applied between the external electrode 6 and the external electrode 9, discharging is induced in the third discharging portion GP19. Similarly, if a voltage with a magnitude which is equal to or more than a predetermined value is applied between the external electrode 7 and the external electrode 10, discharging is induced in the fourth discharging portion GP20.

The discharge inducing portion 101 is positioned for the first discharging portion GP17 and has the function of facilitating the occurrence of discharge in the first discharging portion GP17. The discharge inducing portion 101 connects the first opposite portion 93*b* of the opposite electrode 93 to the second opposite portion 97*b* of the ground electrode 97. The discharge inducing portion 102 is positioned for the second discharging portion GP18 and has the function of facilitating the occurrence of discharge in the second discharging portion GP18. The discharge inducing portion 102 connects the first opposite portion 94*b* of the opposite electrode 94 to the second opposite portion 97*c* of the ground electrode 97.

The discharge inducing portion 103 is positioned for the third discharging portion GP19 and has the function of facilitating the occurrence of discharge in the third discharging portion GP19. The discharge inducing portion 103 connects the first opposite portion 95*b* of the opposite electrode 95 to the second opposite portion 99*b* of the ground electrode 99. The discharge inducing portion 104 is positioned for the fourth discharging portion GP20 and has the function of facilitating the occurrence of discharge in the fourth discharging portion GP20. The discharge inducing portion 104 connects the first opposite portion 96*b* of the opposite electrode 96 to the second opposite portion 99*c* of the ground electrode 99.

The cavity portion 105 is formed for the first discharging portion GP17. The cavity portion 105 has the function of absorbing thermal expansions of the first opposite portion 93*b*, the second opposite portion 97*b*, the insulator layer 11 and the discharge inducing portion 101 during discharging. The cavity portion 106 is formed for the second discharging portion GP18. The cavity portion 106 has the function of absorbing thermal expansions of the first opposite portion 94*b*, the second opposite portion 97*b*, the insulator layer 11 and the discharge inducing portion 102 during discharging. The cavity portion 107 is formed for the third discharging portion GP19. The cavity portion 107 has the function of absorbing thermal expansions of the first opposite portion 95*b*, the second opposite portion 99*c*, the insulator layer 11 and the discharge inducing portion 103, during discharging. The cavity portion 108 is formed for the fourth discharging portion GP20. The cavity portion 108 has the function of absorbing thermal expansions of the first opposite portion

96*b*, the second opposite portion 99*c*, the insulator layer 11 and the discharge inducing portion 104, during discharging.

As described above, the ESD protection component 1E according to the present embodiment also offers the same effects as those of the aforementioned embodiments.

Although embodiments of the present invention have been described, the present invention is not limited to the aforementioned embodiments, and various changes can be made thereto within ranges which do not change the spirits defined in the respective claims.

For example, the ESD protection component 1A to 1E are not necessarily required to include the coils L1 and L2.

What is claimed is:

1. An ESD protection component comprising:

a element body including a plurality of insulator layers are stacked;

a ground electrode placed inside the element body;

a first opposite electrode which is placed to be spaced apart from the ground electrode and forms a discharging portion in cooperation with the ground electrode;

a second opposite electrode which is placed to be spaced apart from the ground electrode and forms a discharging portion in cooperation with the ground electrode; and a plurality of external electrodes each being provided correspondingly to a respective one of the ground electrode, the first opposite electrode and the second opposite electrode;

wherein the ground electrode, the first opposite electrode and the second opposite electrode are each adapted to have an extraction portion connected to the corresponding external electrode out of the plurality of the external electrodes, and an opposite portion which is electrically connected to the extraction portion and forms the discharging portion, the opposite portion of the ground electrode, the opposite portion of the first opposite electrode, and the opposite portion of the second opposite electrode are placed on the same layer, and in at least one of the ground electrode, the first opposite electrode and the second opposite electrode, the extraction portion and the opposite portion are placed on respective different layers and also are electrically connected to each other via a through hole conductor.

2. The ESD protection component according to claim 1, wherein the extraction portion of the ground electrode and the opposite portion of the ground electrode are placed on respective different layers and also are electrically connected to each other via a through hole conductor.

3. The ESD protection component according to claim 2, wherein the extraction portion of the first opposite electrode and the opposite portion of the first opposite electrode are placed on respective different layers and also are electrically connected to each other via a through hole conductor, and the extraction portion of the second opposite electrode and the opposite portion of the second opposite electrode are placed on respective different layers and also are electrically connected to each other via a through hole conductor.

4. The ESD protection component according to claim 1, wherein each of the extraction portions has an end connected to the corresponding external electrode out of the plurality of the external electrodes, the end being exposed from the element body, the exterior surface has a first region in which the end of the extraction portion of the first opposite electrode is exposed and a second region in which the end of the extraction portion of the second opposite electrode is exposed, and the opposite portion of the ground electrode is placed at a position closer to the first region than the opposite portion of the first opposite electrode and, also, the opposite portion of the ground electrode is placed at a position closer to the second region than the opposite portion of the second opposite electrode.

* * * * *